(12) United States Patent
Dejneka et al.

(10) Patent No.: US 9,145,333 B1
(45) Date of Patent: Sep. 29, 2015

(54) CHEMICALLY-STRENGTHENED BOROSILICATE GLASS ARTICLES

(71) Applicant: Corning Incorporated, Corning, NY (US)

(72) Inventors: Matthew John Dejneka, Corning, NY (US); John Christopher Mauro, Corning, NY (US); Marcel Potuzak, Corning, NY (US); Morten Mattrup Smedskjaer, Aalborg (DK); Randall Eugene Youngman, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 244 days.

(21) Appl. No.: 13/905,409

(22) Filed: May 30, 2013

Related U.S. Application Data

(60) Provisional application No. 61/653,481, filed on May 31, 2012.

(51) Int. Cl.
  *C03C 21/00* (2006.01)
(52) U.S. Cl.
  CPC .................... *C03C 21/002* (2013.01)
(58) Field of Classification Search
  USPC ........................................ 65/30.14
  See application file for complete search history.

(56) References Cited

U.S. PATENT DOCUMENTS

| | | | | |
|---|---|---|---|---|
| 3,773,489 | A * | 11/1973 | Forker et al. | 65/30.14 |
| 5,674,790 | A * | 10/1997 | Araujo | 501/66 |
| 6,818,576 | B2 * | 11/2004 | Ikenishi et al. | 501/65 |
| 7,666,511 | B2 * | 2/2010 | Ellison et al. | 428/426 |
| 7,694,530 | B2 * | 4/2010 | Kamiya et al. | 65/30.14 |
| 8,959,953 | B2 * | 2/2015 | Varshneya | 65/30.14 |
| 2006/0006786 | A1 * | 1/2006 | Fechner et al. | 313/493 |
| 2006/0148635 | A1 * | 7/2006 | Miyauchi et al. | 501/65 |
| 2007/0190340 | A1 * | 8/2007 | Coppola et al. | 428/432 |
| 2008/0020919 | A1 * | 1/2008 | Murata | 501/66 |
| 2010/0035745 | A1 * | 2/2010 | Murata | 501/66 |
| 2010/0291353 | A1 * | 11/2010 | Dejneka et al. | 428/192 |
| 2011/0045961 | A1 * | 2/2011 | Dejneka et al. | 501/66 |
| 2011/0201490 | A1 | 8/2011 | Barefoot et al. | 501/66 |

OTHER PUBLICATIONS

Grandjean et al; "Electrical conductivity and $^{11}$B NMR studies of sodium borosilicate glasses"; Journal of Non-Crystalline Solids 354 (208); pp. 1664-1670, Nov. 2007.

* cited by examiner

*Primary Examiner* — Mark Halpern
(74) *Attorney, Agent, or Firm* — Timothy M Schaeberle

(57) ABSTRACT

Methods are disclosed for producing chemically-strengthened, borosilicate, glass articles. The articles are produced from batch components which are selected, at least in part, based on measured and/or estimated values for the coordination state of $B_2O_3$ in the glass. In this way, such chemical-strengthening properties as mutual diffusivity, maximum surface compressive stress, and/or indentation threshold can be improved.

14 Claims, 20 Drawing Sheets

CHEMICALLY-STRENGTHENED BOROSILICATE GLASS ARTICLES

This application claims the benefit of priority under 35 U.S.C. §119 of U.S. Provisional Application Ser. No. 61/653,481 filed on May 31, 2012 the content of which is relied upon and incorporate herein by reference in its entirety.

FIELD

This disclosure relates to methods for producing chemically-strengthened, borosilicate, glass articles. It also relates to methods for producing borosilicate glasses which are suitable for chemical strengthening and, in particular, to methods for selecting batch components for use in producing such glasses.

DEFINITIONS

The term "glasses" (as well as its singular form, "glass") includes both glasses and glass-ceramics.

The term "glass article" (as well as its plural form, "glass articles") is used in its broadest sense to include any object made wholly or partly of glass and/or a glass-ceramic.

BACKGROUND

Chemically-strengthened glass articles, also known as ion-strengthened glass articles, are used in a variety of applications. Perhaps the best-known example of a chemically-strengthened glass article is the scratch-resistant faceplates used in portable electronic devices, e.g., the faceplates made from Corning Incorporated's Gorilla® Glass. In broad overview, such articles are made by forming a glass having a composition suitable for chemical strengthening into a desired configuration, e.g., into a glass sheet in the case of faceplates, and then subjecting the formed glass to chemical strengthening through an ion exchange process, e.g., a treatment in which the formed glass is submersed in a salt bath at an elevated temperature for a predetermined period of time.

The ion-exchange process causes ions from the salt bath, e.g., potassium ions, to diffuse into the glass while ions from the glass, e.g., sodium ions, diffuse out of the glass. Because of their different ionic radii, this exchange of ions between the glass and the salt bath results in the formation of a compressive layer at the surface of the glass which enhances the glass's mechanical properties, e.g., its surface hardness. The effects of the ion exchange process are typically characterized in terms of two parameters: (1) the depth of layer (DOL) produced by the process and (2) the final maximum surface compressive stress (CS). Values for these parameters are most conveniently determined using optical measurements, and commercial equipment is available for this purpose, e.g., instruments sold by Frontier Semiconductor and Orihara Industrial Company, Ltd. As used herein, DOL and CS values are values determined using such equipment.

The selection of batch components for producing glasses suitable for chemical strengthening has been a challenging process involving producing numerous glass samples having different compositions, subjecting those samples to an ion-exchange process, and then testing the resulting ion-exchanged glasses for their DOL and CS values. As a result of this complexity, there exists a need for a systematic approach for selecting components and/or component concentrations of glasses that are going to under go chemical strengthening.

The present disclosure addresses this need for the specific case of glasses that contain $SiO_2$ and $B_2O_3$ as network formers (referred to herein as borosilicate glasses). As discussed below, in accordance with the disclosure, measured and/or estimated values for the coordination state of $B_2O_3$ have been found predictive of the chemical-strengthening properties of borosilicate glasses and thus useful in selecting components of such glasses and/or component concentrations. In particular, measured and/or estimated values for the coordination state of $B_2O_3$ can be used to improve such chemical-strengthening properties as mutual diffusivity, maximum surface compressive stress, and/or indentation threshold.

SUMMARY

A method is disclosed for making a glass article (e.g., a glass sheet) which includes the steps of:
  (I) melting batch materials to produce molten glass; and
  (II) forming a glass article from the molten glass;
wherein:
  (A) the batch materials provide a plurality of components to the glass that affect at least one chemical-strengthening property of the glass;
  (B) the plurality of components includes $SiO_2$ and $B_2O_3$; and
  (C) the method is characterized by the plurality of components and/or their concentrations in the glass being at least partially based on a measurement and/or an estimate of: (i) the percentage of boron in the glass that is threefold coordinated; or (ii) the percentage of boron in the glass that is fourfold coordinated; or (iii) the percentage of boron in the glass that is threefold coordinated and the percentage of boron in the glass that is fourfold coordinated.

In an embodiment:
  (a) the plurality of components comprises at least one cation that has a charge of +1, e.g., $Na^{+1}$;
  (b) at least one chemical-strengthening property of the glass is mutual diffusivity during an ion-exchange process of the cation and a cation of a bath used in the ion-exchange process (e.g., $K^{+1}$), the cation of the bath having a charge of +1; and
  (c) the measured or estimated percentage of boron in the glass that is threefold coordinated is greater than the measured or estimated percentage of boron in the glass that is fourfold coordinated.

In an embodiment,
  (a) at least one chemical-strengthening property of the glass is the maximum surface compressive stress (CS) produced in the glass when the glass article is subjected to an ion-exchange process; and
  (b) the measured or estimated percentage of boron in the glass that is threefold coordinated is greater than the measured or estimated percentage of boron in the glass that is fourfold coordinated.

In an embodiment:
  (a) at least one chemical-strengthening property of the glass is the glass's indentation threshold after the glass article has been subjected to an ion-exchange process; and
  (b) the measured or estimated percentage of boron in the glass that is threefold coordinated is greater than the measured or estimated percentage of boron in the glass that is fourfold coordinated.

With regard to the components of the glass that affect at least one chemical-strengthening property of the glass, it should be noted that those components can include clusters of constituents and/or constituents that might in some contexts be considered contaminants, e.g., water which would be considered a contaminant in, for example, glasses used in optical waveguide fibers. As to units, the composition can be expressed in any convenient units, mole percent and weight percent being the most common choices.

The above summaries are only for the convenience of the reader and are not intended to and should not be interpreted as limiting the scope of the invention. More generally, it is to be understood that both the foregoing general description and the following detailed description are merely exemplary of the invention and are intended to provide an overview or framework for understanding the nature and character of the invention.

Additional features and advantages of the invention are set forth in the detailed description which follows, and in part will be readily apparent to those skilled in the art from that description or recognized by practicing the invention as exemplified by the description herein. The accompanying drawings are included to provide a further understanding of the invention, and are incorporated in and constitute a part of this specification. It is to be understood that the various features of the invention disclosed in this specification and in the drawings can be used in any and all combinations.

BRIEF DESCRIPTION OF THE DRAWINGS

FIG. 5 uses a linear scale and FIG. 6 a logarithmic scale to display the data. The error bars represent the standard deviation of eight measurements on the same sample. The abbreviation MNFE in FIG. 6 stands for Mixed Network Former Effect.

Figure 1:
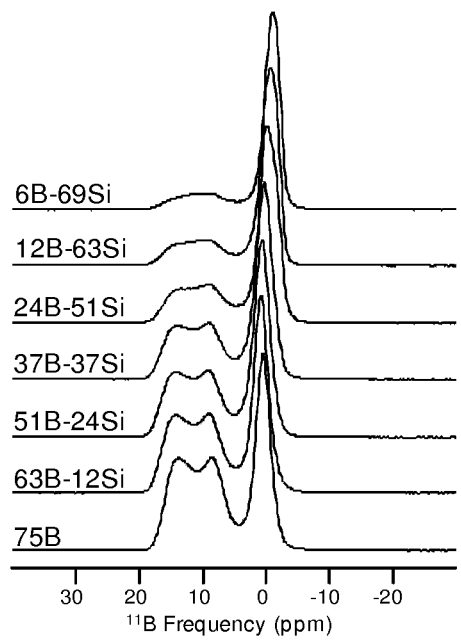
FIG. 1 is a plot showing $^{11}$B MAS NMR spectra for the borosilicate glasses of Table 1A.
Figure 2:
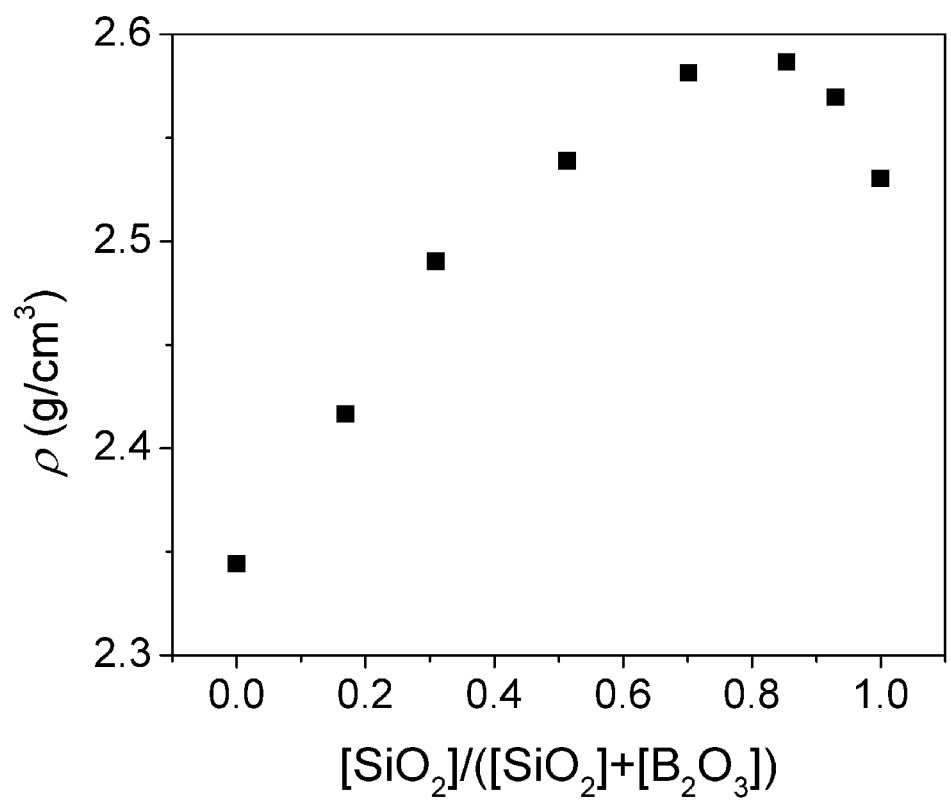
FIG. 2 is a plot showing the composition dependence of the glass density ($\rho$) of the borosilicate glasses of Table 1B.

In the figures, concentrations are in mole percent.

DETAILED DESCRIPTION

I. Introduction

Understanding the structural origins of cationic diffusion processes in silicate glasses is crucial for high-tech applications such as ion-exchange strengthening. For glasses with more than one network former, transport properties such as diffusivity are often nonlinear functions of the particular distribution of the network formers, a phenomenon known as the mixed network former effect (MNFE). See, for example, M.

Schuch, C. R. Müller, P. Maass, and S. W. Martin, Phys. Rev. Lett. 102, 145902 (2009). In particular, the mixed network former effect can be defined as the non-additive variation of a transport property as a function of the glass former composition at fixed modifier content.

The mixed network former effect has been found in various mixed network former systems, including $SiO_2$—$B_2O_3$, $SiO_2$—$TeO_2$, $P_2O_5$—$B_2O_3$, $P_2O_5$—$TeO_2$, $B_2O_3$—$TeO_2$, $B_2O_3$—$V_2O_5$, $MoO_3$—$B_2O_3$, $MoO_3$—$P_2O_5$, $MoO_3$—$TeO_2$, $B_2S_3$—$P_2S_5$, $GeO_2$—$GeS_2$, and $GeS_2$—$SiS_2$. The effect has been observed as both maxima and minima in the transport property when one network former is replaced by another one. However, it is not a universal phenomenon in all mixed network former systems. Although there may be a fundamental structural origin for the mixed network former effect, to date, a detailed understanding of it is still lacking due to the complicated non-crystalline structure of multi-component glasses.

Of the glass systems mentioned above, borosilicate glasses are the most technologically important. For example, alkali borosilicates have been applied for decades as thermal shock-resistant glasses (e.g., Pyrex®), and alkaline earth borosilicate glasses are used as substrate glasses for liquid crystal displays (e.g., EAGLE XG®). In borosilicate glasses, the mixing of silicon and boron structural units can be used to control and design the physical and chemical properties of these glasses. From a scientific perspective, the mixing of the structural units in borosilicates constitutes a major challenge due to the variety of possible structural groups in addition to the coordination change of boron with addition of network modifier ions (i.e., alkali or alkaline earth ions). The latter effect is referred to as the "boron anomaly", in which the initial addition of network modifier ions affects properties differently compared to further additions of these same modifiers. In detail, glassy $B_2O_3$ consists of corner-sharing $BO_{3/2}$ triangles ($B^3$), a large fraction of which combine to form three-membered boroxol ring units. Upon addition of alkali or alkaline earth oxide to $B_2O_3$, there are two possibilities: (a) creation of a non-bridging oxygen (NBO), rupturing the linkage between two trigonally-coordinated $B^3$ groups; or (b) conversion of boron from three-coordinated (trigonal boron, $B^3$) to a four-coordinated (tetrahedral boron, $B^4$) state without the creation of a NBO.

Understanding the structural foundation of the composition and temperature dependence of diffusion in borosilicate glasses is thus a major challenge. However, it is an important one, since tailoring of the alkali diffusivity in borosilicate glasses is crucial for ion-exchange strengthening. Studies of the transport properties of primarily sodium borosilicate glasses have led to the general conclusion that sodium diffusivity strongly decreases with increasing $B_2O_3$ content. However, since several factors (e.g., changes in water content and free volume) can contribute to the observed composition dependence, it remains unclear to what extent glass structure variations are responsible for this dependence.

In particular, the extent to which the $B^3$ and $B^4$ groups, respectively, affect ion exchange properties and the consequent surface strengthening and damage resistance has hitherto remained unknown. The remainder of the disclosure is directed to experimental studies and analyses performed to determine the effects of $B^3$ and $B^4$ groups on the chemical-strengthening properties of borosilicate glasses. As will be shown, having the percentage of boron that is threefold coordinated greater than the percentage of boron that is fourfold coordinated improves such chemical-strengthening properties as mutual diffusivity, maximum surface compressive stress, and/or indentation threshold.

The description that follows is divided into three parts. The first part deals with the diffusivity of "model" (less complicated) glasses of borosilicate composition, whereas the second part deals with more complicated borosilicate glasses, i.e., boroaluminosilicate glasses. The third part deals with the impact of three-coordinated boron on indentation threshold.

II. Ion-Exchange Properties of "Model" Borosilicate Glasses

The composition dependence of sodium-potassium inter-diffusion during ion exchange and, in particular, the dependence on boron speciation, was studied for a series of soda lime borosilicate glasses. The glasses for which speciation data was obtained are shown in Table 1A.

Specifically, for these glasses (as well as for the other iron free glasses discussed herein), the fractions of trigonal and tetrahedral boron were determined by $^{11}B$ MAS (magic angle spinning) NMR (nuclear magnetic resonance) spectroscopy. The experiments were conducted at 11.7 T (160.34 MHz resonance frequency) using a commercial spectrometer (VN-MRs, Agilent) and a commercial 3.2 mm MAS NMR probe (Varian/Chemagnetics). Powdered glasses were packed into 3.2 mm zirconia rotors with sample spinning at 20 kHz. 0.6 μs radio-frequency pulses, corresponding to a π/12 tip angle, were used to uniformly excite the $^{11}B$ central transitions and thus provide quantitatively accurate B speciation. The $^{11}B$ MAS NMR spectra were processed without additional line broadening and referenced using aqueous boric acid at 19.6 ppm relative to the conventional shift reference ($BF_3$-$Et_2O$). The lineshapes obtained are shown in FIG. 1.

The $^{11}B$ MAS NMR lineshapes were simulated using one or two trigonal peaks with second-order quadrupolar effects, and a single mixed Gaussian/Lorentzian peak for the tetrahedral B resonance. Peak intensities were obtained by numerical integration of the various simulated lineshapes. The $N_4$ values of Table 1A were obtained by integration of the $B^4$ and $B^3$ simulated peaks.

Other techniques for determining boron speciation, including other analysis techniques, now known or subsequently developed, can, of course, be used if desired. The MAS NMR approach, however, is well-established and widely used, and thus is preferred.

Glasses having substantially the same compositions as those of Table 1A but containing approximately 1.0 mol % $Fe_2O$ were also studied. The compositions of these glasses are shown in Table 1B. The presence of iron atoms interferes with $^{11}B$ MAS NMR, and thus $N_4$ values were not measured for these glasses. In practice, it has been found that the glasses containing iron have substantially the same $N_4$ values as those which are iron free. Accordingly, the boron speciation data for the iron-free glasses can be used as an estimate for the iron-containing glasses. Similar estimates can be made for glasses containing other constituents that can interfere with boron speciation measurements. More generally, estimates of boron speciation can be made between glasses having similar compositions even for glasses for which measurements could be made. Likewise, estimates can be based on computer-implemented models or combinations of models and measurements.

Figure 8:
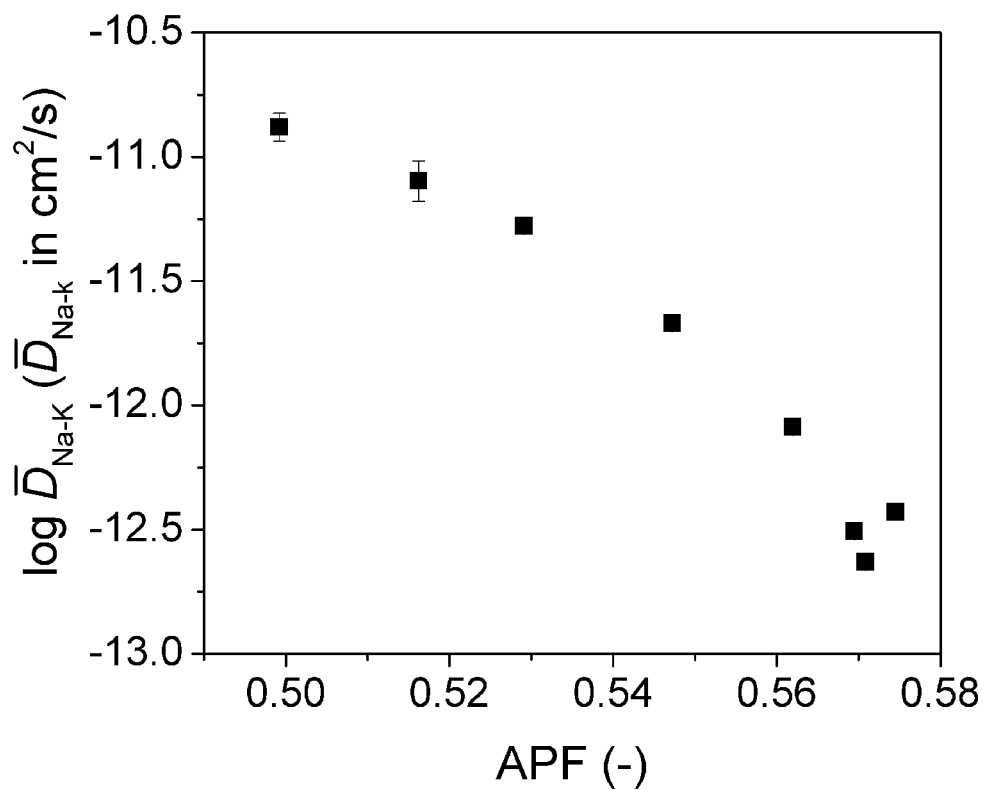
FIG. 8 is a plot showing the dependency of the logarithmic sodium-potassium diffusivity on atomic packing factor (APF) for the borosilicate glasses of Table 1B.
Figure 9:
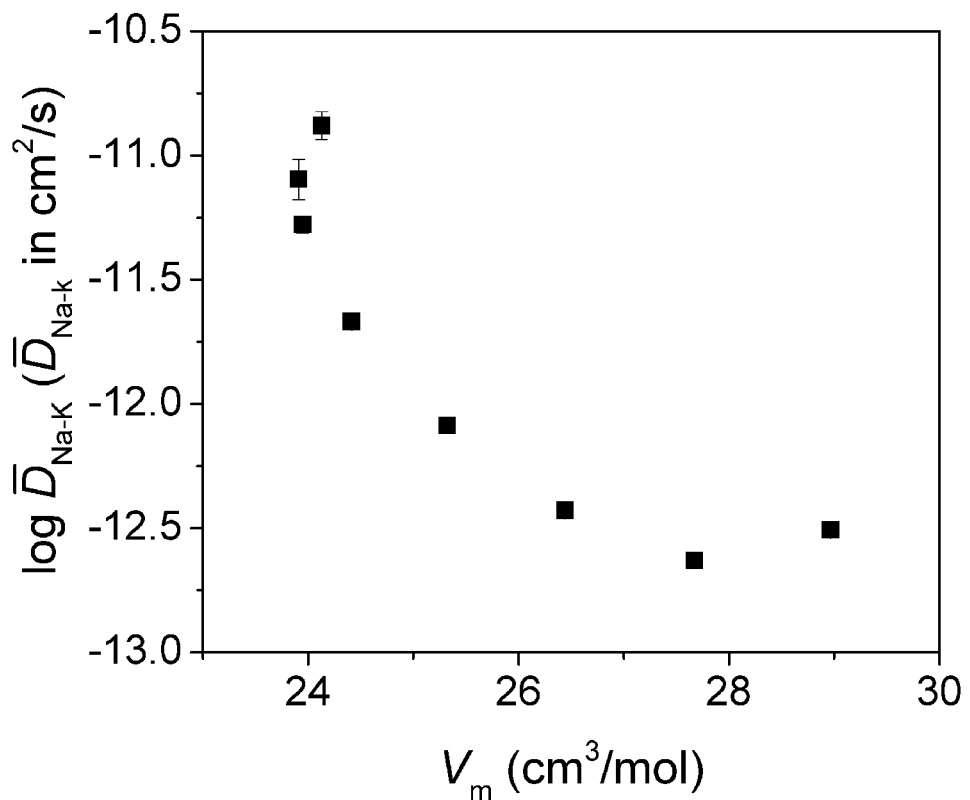
FIG. 9 is a plot showing the dependency of the logarithmic sodium-potassium diffusivity on molar volume ($V_m$) for the borosilicate glasses of Table 1B.
Figure 10:
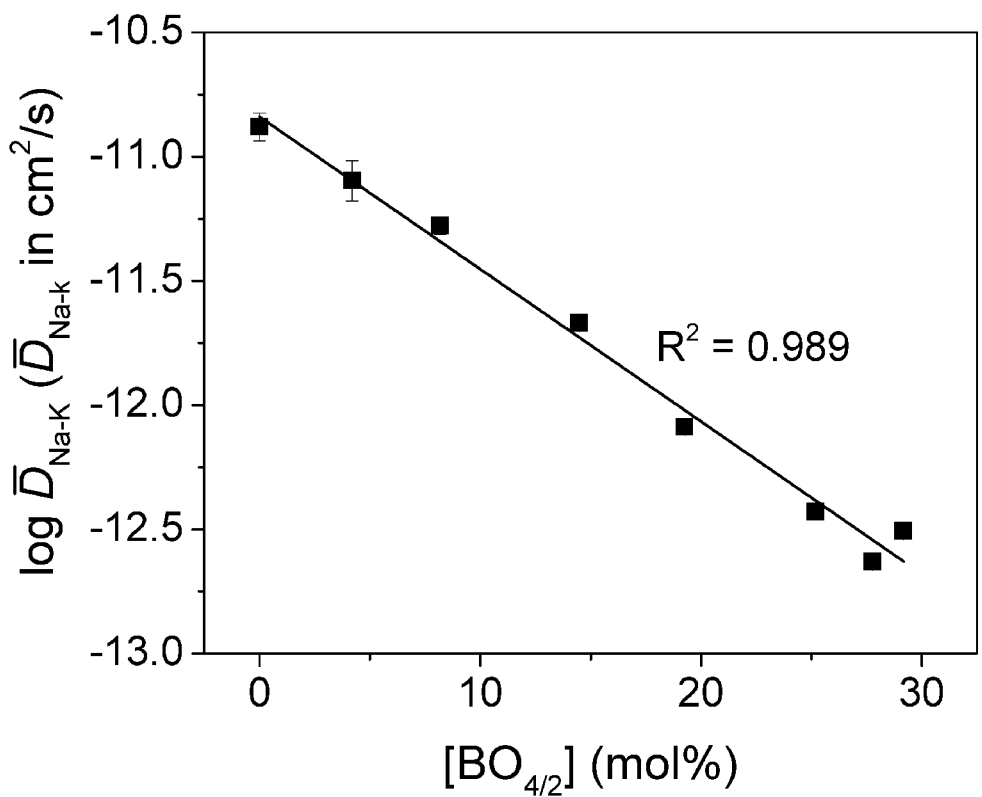
FIG. 10 is a plot showing the effective interdiffusion coefficient ($\overline{D}_{Na\text{-}K}$) as a function of the concentration of four-coordinated boron units (BO$_{4/2}$) for the borosilicate glasses of Table 1A. The solid line represents a linear fit to the data.
Figure 11:
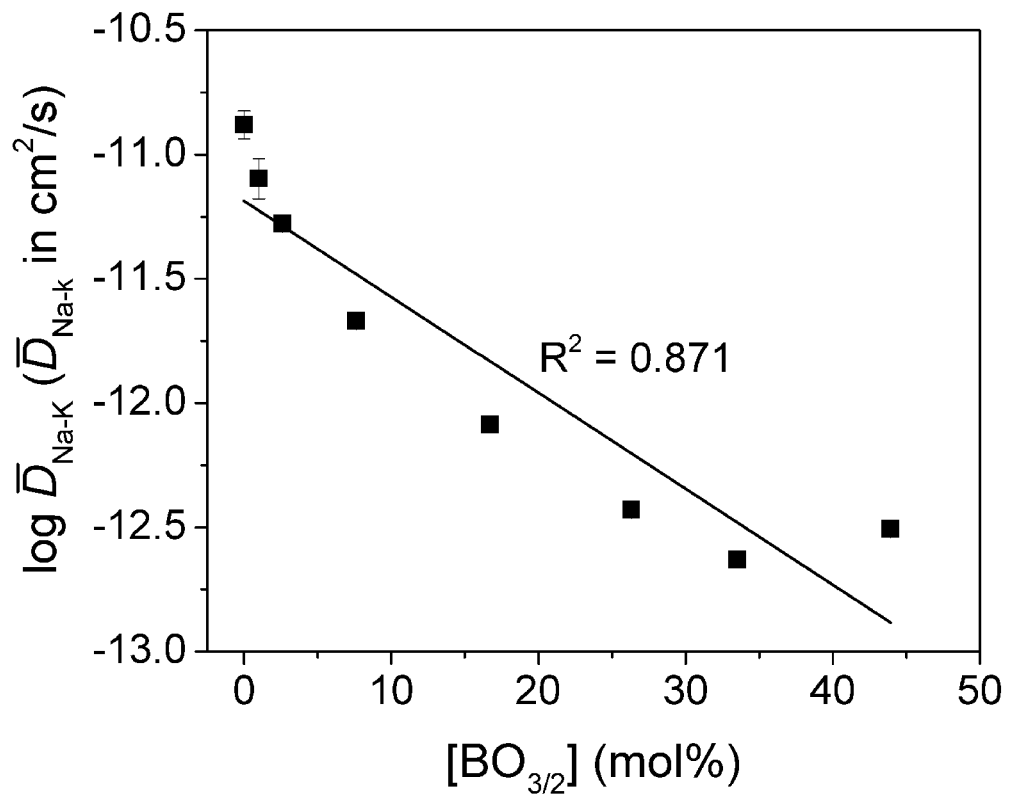
FIG. 11 is a plot showing the effective interdiffusion coefficient ($\overline{D}_{Na\text{-}K}$) as a function of the concentration of three-coordinated boron units (BO$_{3/2}$) for the borosilicate glasses of Table 1A. The solid line represents a linear fit to the data.

Data from the iron series of Table 1B is used in FIGS. 2-9, but has otherwise been omitted to simplify the presentation. The boron speciation data of FIGS. 10 and 11 is for the iron-free glasses of Table 1A. In terms of chemical-strengthening properties, the results for the iron-containing and iron-free glasses were substantially the same.

As can be seen in Tables 1A and 1B, the analysis covered the extremes from pure borate to pure silicate end members at fixed $Na_2O$ and CaO contents of 15 and 10 mol %, respectively. By holding the amount of modifier constant for all the glasses, the possibility of diffusivity changes as a result of a difference in the number of mobile cations was eliminated. By varying the glass composition from pure borate to pure silicate, diffusivity could be investigated in three different structural regimes: (i) $Na^+$ and $Ca^{2+}$ to convert boron from trigonal to tetrahedral configuration; (ii) $Na^+$ and $Ca^{2+}$ to form NBOs on trigonal boron: and (iii) $Na^+$ and $Ca^{2+}$ to form NBOs on tetrahedral silicon.

Density ($\rho$), glass transition temperature ($T_g$), iron redox state, and water content were determined prior to any diffusion experiments. $T_g$ was determined using DSC at a heating/cooling rate of 10° K/min. The error associated with this method is generally 2-3° K. Sodium/potassium interdiffusion coefficients ($\bar{D}_{Na-K}$ values) were determined by ion exchange experiments in a molten $KNO_3$ bath and subsequent characterization of the refractive index profile at the surface.

In particular, for the ion exchange experiments, annealed glasses were cut into square slides (10×10×1 $mm^3$) and both faces were polished. The samples were then immersed into a molten salt bath of technical grade $KNO_3$ at 450° C. for 32 h. The penetration depth of the potassium ions was determined in order to obtain the effective interdiffusion coefficient $\bar{D}_{Na-K}$. The exchange between $Na^+$ and $K^+$ gives the glass surface a higher refractive index than the interior, which is utilized in an FSM-6000 instrument (Frontier Semiconductor) to measure the saturation depth of the refraction index profile, which corresponds to the diffusion depth (DOL) of potassium. A total of eight FSM measurements were performed on each sample (using four 90° rotations per face). The DOL values were converted to $D_{Na-K}$ values using the equation:

$$DOL = 2 \cdot a\sqrt{D_{Na-K} \cdot t}$$

where t is time and a is a constant with a value of ~1.4.

An examination of the $T_g$ data of Tables 1A and 1B shows that $T_g$ first increases with increasing $[SiO_2]/([SiO_2]+[B_2O_3])$ ratio and then slightly decreases when the ratio is above ~0.85. Qualitatively, this can be explained by an increasing number of rigid constraints around silicon atoms compared to those around boron. On the other hand, the presence of $B_2O_3$ causes some of the modifiers to be used for charge-balancing four-coordinated boron and thus not creating NBOs. A high concentration of NBOs corresponds to a lower network connectivity, which generally results in a lower glass transition temperature. This is why $T_g$ increases with increasing concentration of $B_2O_3$ in the region of higher $[SiO_2]/([SiO_2]+[B_2O_3])$ ratios, where some modifiers are utilized for charge-balancing boron instead of creating NBOs. The composition dependence of $T_g$ is thus a reflection of the structural change of the glassy network with composition. Such knowledge is helpful in understanding the composition and temperature dependence of diffusion in glass.

It is of value to have information regarding the free volume in the glass structure that is available to the network modifiers for diffusion. This quantity can be estimated by first measuring the density of the glass samples (see FIG. 2). Based on the density, the atomic packing factor (APF) can be calculated.

APF is the ratio between the minimum theoretical volume occupied by the ions and the corresponding molar volume of the glass. Hence, the APF gives information about the free volume in the glass available for diffusion and not simply the overall molar volume ($V_m$) of the glass. APF can be calculated as (see T. Rouxel, J. Am. Ceram. Soc. 90, 3019 (2007)):

$$APF = \rho \frac{\sum f_i V_i}{\sum f_i M_i}, \tag{1}$$

where for the ith constituent with the formula $A_x B_y$, $f_i$ is the constituent's molar fraction, $M_i$ its molar mass, and $V_i=(4/3)\pi N_a(xr_A^3+yr_B^3)$ its theoretical volume, where $r_A$ and $r_B$ are ionic radii and $N_a$ is Avogadro's number.

Figure 3:
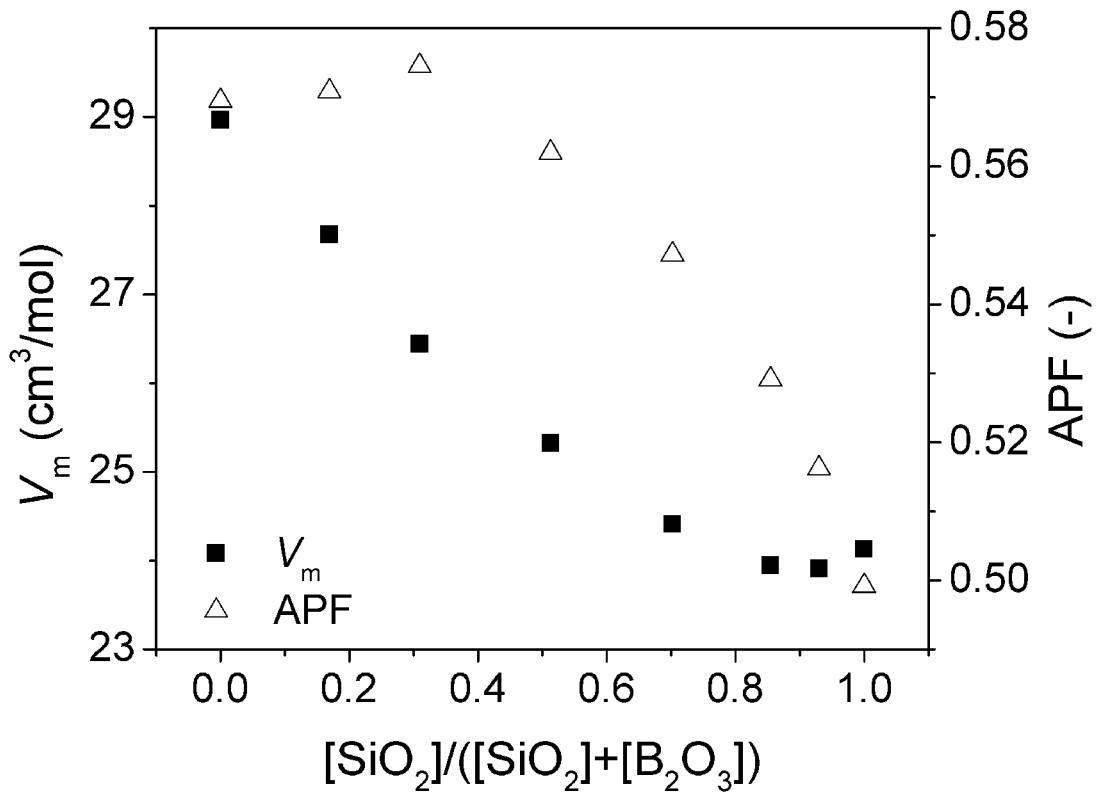
FIG. 3 is a plot showing the compositional dependence of molar volume ($V_m$) and atomic packing factor (APF) of the borosilicate glasses of Table 1B. APF is calculated using Eq. (1) from densities, compositions, and ionic radii.

FIG. 3 illustrates the composition dependence of both molar volume ($V_m=M/\rho$) and APF, where APF has been calculated using Eq.(1) and the effective ionic radii given in Table I of R. D. Shannon, Acta Crystallogr., Sect. A: Cryst. Phys., Diffr., Theor. Gen. Crystallogr. 32, 751 (1976). As can be seen in this figure, while $V_m$ gradually decreases with increasing silica content, APF is unaffected by addition of $B_2O_3$ to the soda lime silicate glass until $[B_2O_3]$ equals ~10 mol % and then decreases with further additions of $B_2O_3$. Hence, the network structure of the borate end-member is significantly more closely packed than the silicate end-member, providing less open space for the modifiers to diffuse.

The water content of the glasses of Table 1B was estimated using FT-IR spectroscopy to determine the intensity of the Si—OH and B—OH stretching bands. This was done following conventional procedures for sodium borosilicate glasses. See X. Wu and R. Dieckmann, J. Non-Cryst. Solids 357, 2846 (2011); X. Wu, A. K. Varshneya, and R. Dieckmann, J. Non-Cryst. Solids 357, 3661 (2011); and A. K. Bandyopadhyai, R. Jabra, and J. Phalippou, J. Mater. Sci. Lett. 8, 1464 (1989). The analysis is based on the Beer-Lambert law, which relates the concentration (by weight) of water in the glass ($c_{H_2O}$) to the absorbance of the IR beam through the glass (A):

$$c_{H_2O} = \frac{A \cdot M_{H_2O}}{\varepsilon_{H_2O} \cdot \Delta x \cdot \rho} = \frac{A \cdot M_{H_2O}}{2\varepsilon_{OH} \cdot \Delta x \cdot \rho}, \tag{2}$$

where $M_{H_2O}$ is the molar mass of $H_2O$, $\varepsilon_{H_2O}$ is the molar absorption coefficient related to the overall concentration of water in the glass, and $\Delta x$ is the sample thickness. The molar absorption coefficient of OH groups ($\varepsilon_{OH}$) is approximately equal to one half of $\varepsilon_{H_2O}$, assuming that all water is present in the form of OH groups. See X. Wu and R. Dieckmann, J. Non-Cryst. Solids 357, 2846 (2011); and X. Wu, A. K. Varshneya, and R. Dieckmann, J. Non-Cryst. Solids 357, 3661 (2011). Although the actual values of $\varepsilon_{OH}$ for the studied glasses is not known, studies have shown that variations of $\varepsilon_{OH}$ are within one order of magnitude for various silicate glasses. See C. Peuker, W. Bessau, K. W. Brzezinka, A. Kohl, U. Reinholz, and H. Geibler, Glass Sci. Technol. 75, 313 (2002).

Following X. Wu and R. Dieckmann, J. Non-Cryst. Solids 357, 2846 (2011) and X. Wu, A. K. Varshneya, and R. Dieckmann, J. Non-Cryst. Solids 357, 3661 (2011), Eq.(2) can be reorganized as:

$$c_{H_2O} \cdot \varepsilon_{OH} = \frac{A \cdot M_{H_2O}}{2 \cdot \Delta x \cdot \rho}. \tag{3}$$

Figure 4:
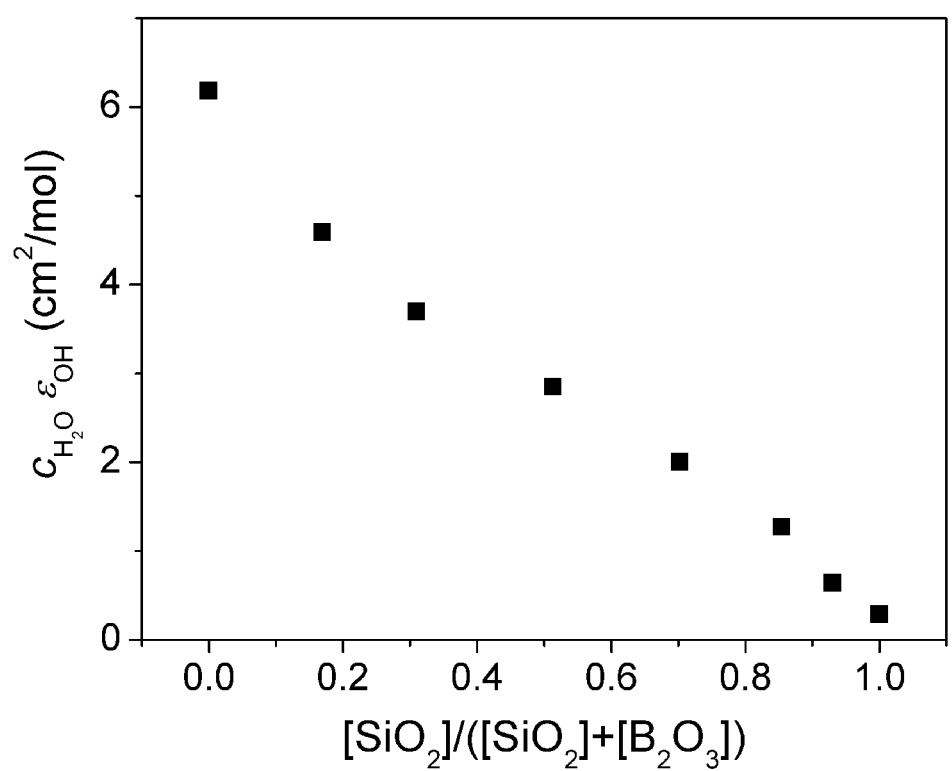
FIG. 4 is a plot showing the initial water contents of the borosilicate glasses of Table 1B. Water contents were determined using transmission FT-IR spectroscopy and are expressed as the product of the mass fraction of water in the glass ($c_{H_2O}$) and the molar absorption coefficient of OH groups ($\epsilon_{OH}$).

Assuming $\epsilon_{OH}$ to be a constant, variations in water concentrations are proportional to the right hand side of Eq.(3). FIG. 4 shows the values of $c_{H_2O} \cdot \epsilon_{OH}$ as a function of composition. As shown in this figure, due to the more hygroscopic nature of borate in comparison to silicate glasses, the water content decreases with increasing $[SiO_2]/([SiO_2]+[B_2O_3])$ ratio.

The sodium-potassium interdiffusion coefficient $D_{Na-K}$ is given by the Nernst-Planck equation:

$$D_{Na-K} = \frac{D_{Na} D_K}{D_{Na} N_{Na} + D_K N_K}, \quad (4)$$

where $D_i$ and $N_i$ are, respectively, the self-diffusion coefficient and fractional concentration of alkali ion i. However, $D_{Na-K}$ varies with local composition (i.e., position of the surface diffusion profile) and time (see A. K. Varshneya and M. E. Milberg, J. Am. Ceram. Soc. 57, 165 (1974)), and we therefore define the effective interdiffusion coefficient ($\overline{D}_{Na-K}$) as a constant for a given diffusion profile.

Figure 5:
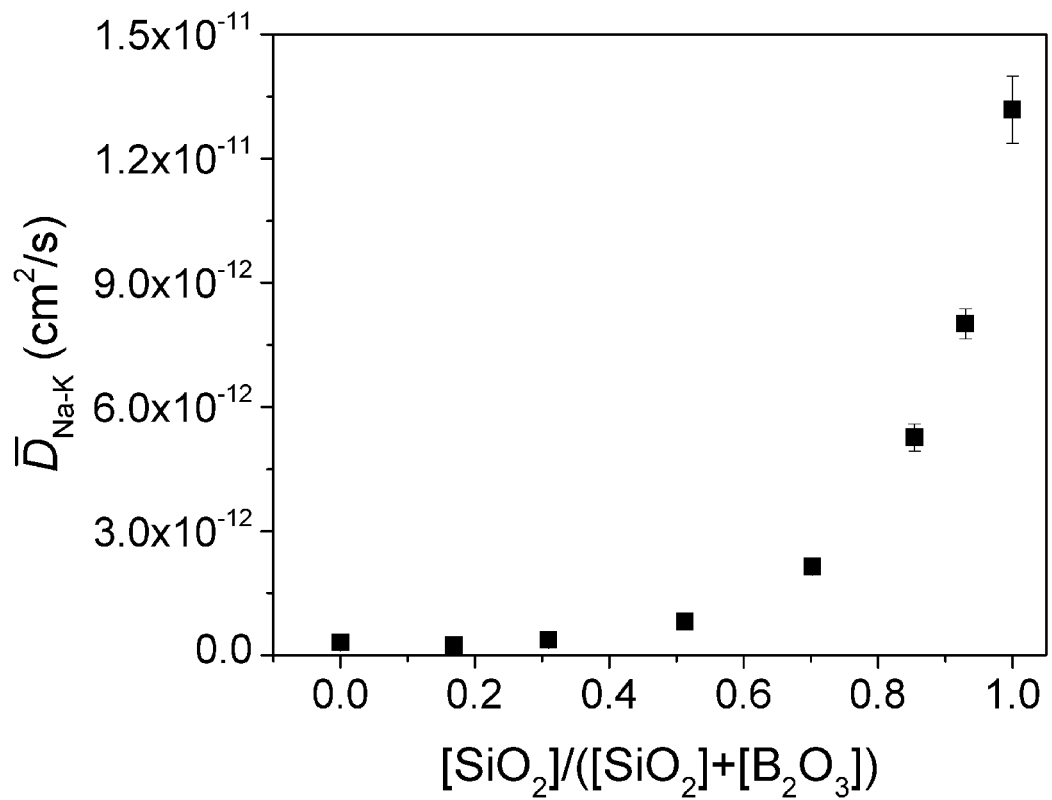
FIGS. 5 and 6 are plots showing the composition dependence of the K$^+$-for-Na$^+$ effective interdiffusion coefficient ($\overline{D}_{Na\text{-}K}$) for the borosilicate glasses of Table 1B as determined from isothermal ion exchange experiments at 450° C.
Figure 6:
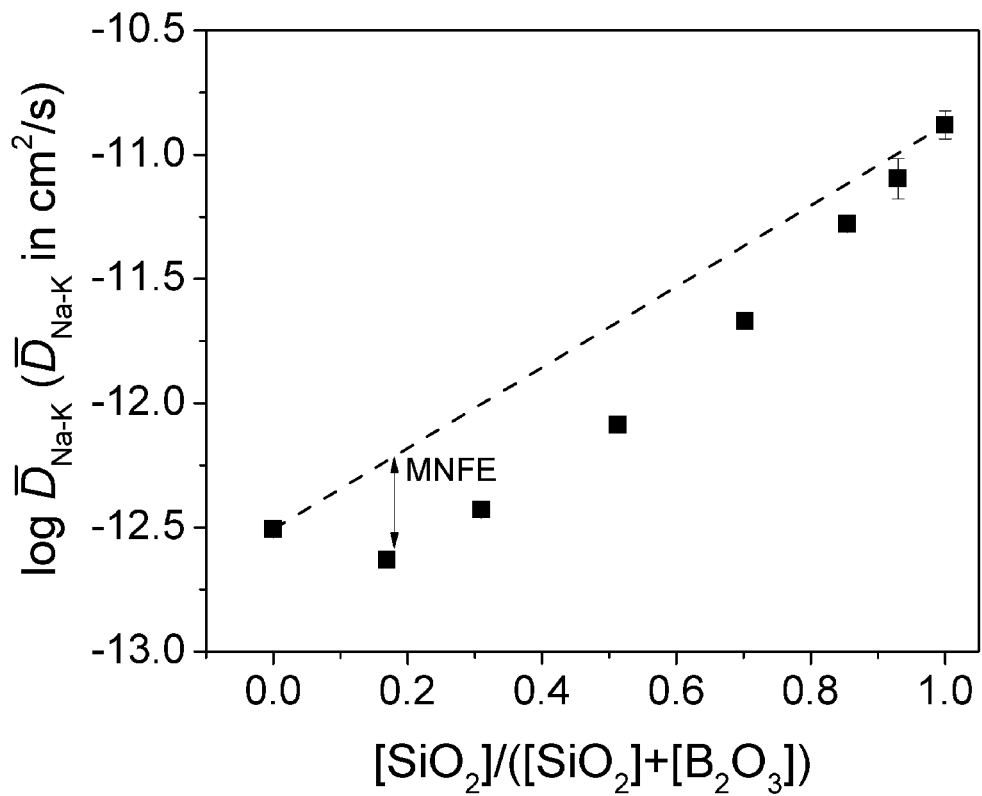
Figure 7:
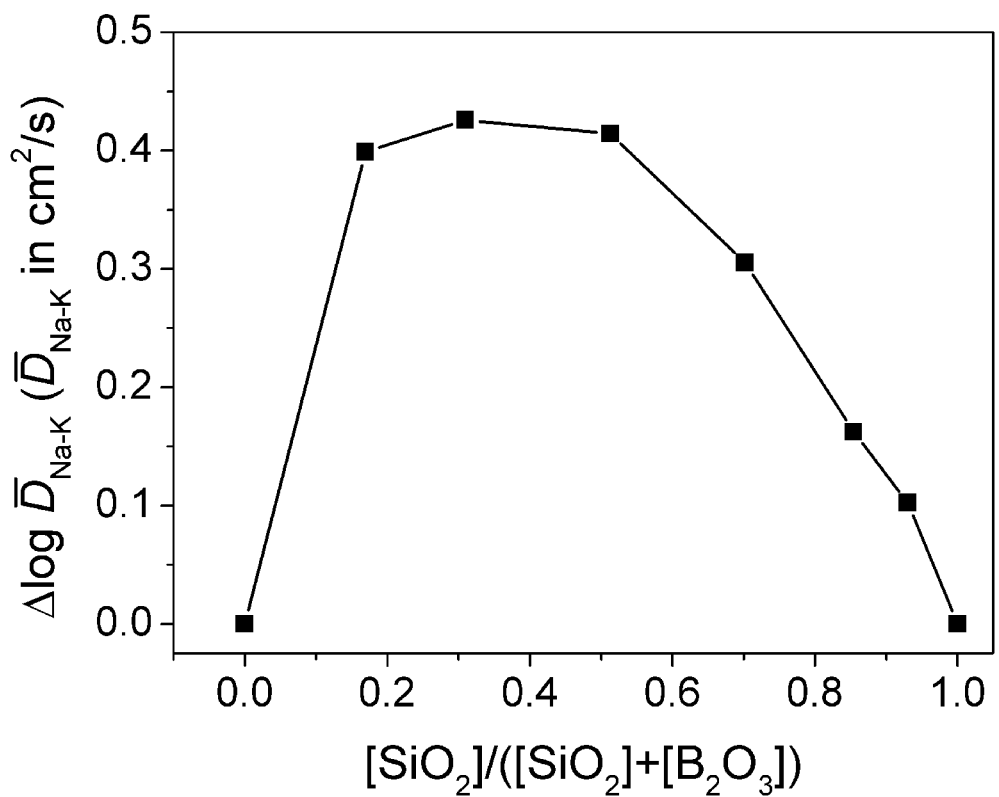
FIG. 7 is a plot showing the composition dependence of the difference $\Delta \log \overline{D}_{Na\text{-}K}$ between measured values of $\log \overline{D}_{Na\text{-}K}$ and those predicted assuming linearity between the two end-member glasses for the borosilicate glasses of Table 1B, i.e., the plot shows the degree of MNFE of the borosilicate glasses of Table 1B.

From the determined surface penetration depth of the potassium ions and the ion exchange time, $\overline{D}_{Na-K}$ values at 450° C. were calculated for the glasses of Table 1B. The results are shown in FIG. 5. As shown therein, $\overline{D}_{Na-K}$ strongly depends on the $[SiO_2]/[B_2O_3]$ ratio, with diffusion occurring much faster in the silica-rich glasses. To illustrate this more clearly, the composition dependence of log $\overline{D}_{Na-K}$ is plotted in FIG. 6. This plot reveals a significant MNFE effect with a non-linear relationship between the logarithmic diffusivities of the two end-member glasses. In fact, the lowest value of $\overline{D}_{Na-K}$ is found for the 62B-12Si glass. The difference between the measured values of log $\overline{D}_{Na-K}$ and the linear relationship (i.e., the degree of MNFE) is designated as Δ log $\overline{D}_{Na-K}$ and plotted as a function of composition in FIG. 7

Several factors can influence the sodium-potassium interdiffusivity in the studied borosilicate glasses, including the structural role of the modifier cations, the free volume, and the presence of impurities. FIG. 4 shows that the concentration of OH groups increases with decreasing $[SiO_2]/([SiO_2]+[B_2O_3])$ ratio, while FIG. 5 shows that simultaneously the sodium-potassium diffusivity decreases. Although L. Tian, R. Dieckmann, C.-Y. Hui, and J. G. Couillard, J. Non-Cryst. Solids 296, 123 (2001), L. Tian, H. X. Lu, and R. Dieckmann, Phys. Chem. Chem. Phys. 5, 2202 (2003), and L. Tian and R. Dieckmann, J. Non-Cryst. Solids 352, 679 (2006) concluded that the presence of OH groups slows down ionic transport processes, it is not known how large the influence of OH groups is on the cationic diffusivities for the glasses of Tables 1A and 1B.

FIG. 3 shows that the glass becomes more tightly packed with decreasing $[SiO_2]/[SiO_2]+[B_2O_3])$ ratio. Hence, there is less space available for the modifying cations, which should also contribute to the lowering of diffusivities, even though the molar volume is actually increasing with decreasing $[SiO_2]/([SiO_2]+[B_2O_3])$. FIGS. 8 and 9 plot the logarithmic diffusivities against APF and $V_m$, respectively. The logarithmic diffusivities decrease linearly with increasing APF, whereas there is no clear dependence on $V_m$. This is because the free volume in the network structure (as reflected by APF) is more important for diffusivities than the overall molar volume of the glass.

Consequently, both the change in water content and atomic packing fractions contribute to the observed composition dependence of isothermal diffusivity. To further understand this composition dependence, it is helpful to consider the composition-structure relation of the glasses. In the silicate end-member composition, $Na^+$ and $Ca^{2+}$ depolymerize the network by creating NBOs. In the borate end-member composition, essentially all $Na^+$ and $Ca^{2+}$ ions are used for charge-balancing tetrahedral boron. However, the structure of the glasses with compositions between the two end-members is not as simple, i.e., $Na^+$ and $Ca^{2+}$ could convert boron from trigonal to tetrahedral configuration, form NBOs on trigonal boron, and/or form NBOs on tetrahedral silicon.

From Table 1A, it can be shown that the fraction of modifiers creating NBOs increases gradually with increasing $[SiO_2]/([SiO_2]+[B_2O_3])$ ratio (see M. M. Smedskjaer, J. C. Mauro, R. E. Youngman, C. L. Hogue, M. Potuzak, and Y. Z. Yue, J. Phys. Chem. B, 115 (44), 12930-12946 (2011)), whereas the fraction of tetrahedral boron to total boron ($N_4$) gradually decreases. Moreover, as shown in, for example, FIG. 5, the diffusivities change most dramatically with composition near the silicate end-member. This indicates that the presence of $BO_{3/2}$ and $BO_{4/2}$ groups plays a major role in decreasing the diffusivities.

To help understand this behavior, FIGS. 10 and 11 plot log $\overline{D}_{Na-K}$ vs. $[BO_{4/2}]$ and $[BO_{3/2}]$, respectively, using the analyzed compositions and the measured $N_4$ values of Table 1A. As noted above and shown in M. M. Smedskjaer, J. C. Mauro, S. Sen, and Y. Z. Yue, Chem. Mater. 22, 5358 (2010), the $N_4$ values from iron-free glasses can be regarded as those of the iron-containing glasses with the same main composition, since the presence of 1 mol % $Fe_2O_3$ does not significantly change the boron speciation.

As shown in FIGS. 10 and 11, 99% of the variation in log $\overline{D}_{Na-K}$ can be explained by the variation in $BO_{4/2}$ concentration (FIG. 10), whereas only 87% of the variation can be explained by the change in $BO_{3/2}$ concentration (FIG. 11). Consequently, the tetrahedral boron groups are considered to be the main contributors to the lowering of diffusivities. Although not wishing to be bound by any particular theory of operation, this effect might be related to the possibility that $BO_{4/2}$ units are in close proximity to one another, leading to a "crowded" environment for diffusion. Alternatively, the partial molar volume of $BO_{4/2}$ units could be lower than that of the $BO_{3/2}$ units, as reflected in the calculated atomic packing factor.

Irrespective of the theory used to explain the effect, from FIGS. 10 and 11, it can be seen that to increase mutual diffusivity during an ion-exchange process, it is important for the measured or estimated percentage of boron in the glass that is threefold coordinated to be greater than the measured or estimated percentage of boron that is fourfold coordinated. In terms of the "model" glasses of Tables 1A and 1B, this means operating towards compositions at the tops of the tables, rather than towards compositions at the bottoms.

II. Ion-Exchange Properties of Boroaluminosilicate Glasses

The influence of boron speciation on ion exchange properties of more complicated sodium boroaluminosilicate glasses was also studied. In order to explore different roles of sodium on the mixing behavior of boroaluminosilicate glasses, a set of $Na_2O$—$B_2O_3$—$Al_2O_3$—$SiO_2$ glasses were designed having various $[Al_2O_3]/[SiO_2]$ ratios so as to access different regimes of sodium behavior: 1) $Na^+$ to stabilize aluminum in a tetrahedral configuration; 2) $Na^+$ to convert boron from trigonal to tetrahedral coordination; 3) $Na^+$ to form nonbridging oxygens on silica tetrahedra or boron. The studied compositions are shown in Tables 2A and 2B.

NMR measurements show that when $[Na_2O]<[Al_2O_3]$, all sodium is used to charge compensate four-coordinated aluminum species (AlO$_4$). The aluminum ions that are not charge-compensated are primarily found in five-fold coordination (AlO$_5$). When [Na$_2$O]>[Al$_2$O$_3$], sodium first charge-compensates AlO$_4$, i.e., all Al is four-coordinated and thus unaffected by composition. Hence, there is preference in the formation of AlO$_4$ over that of BO$_4$. After charge-compensating AlO$_4$, not all of the excess Na$_2$O is used to convert BO$_3$ to BO$_4$; instead, some of the sodium ions are used to create non-bridging oxygens on silicon and boron (Si—NBO and B—NBO). Therefore, there is a competition between converting BO$_3$ and creating NBOs.

Figure 12:
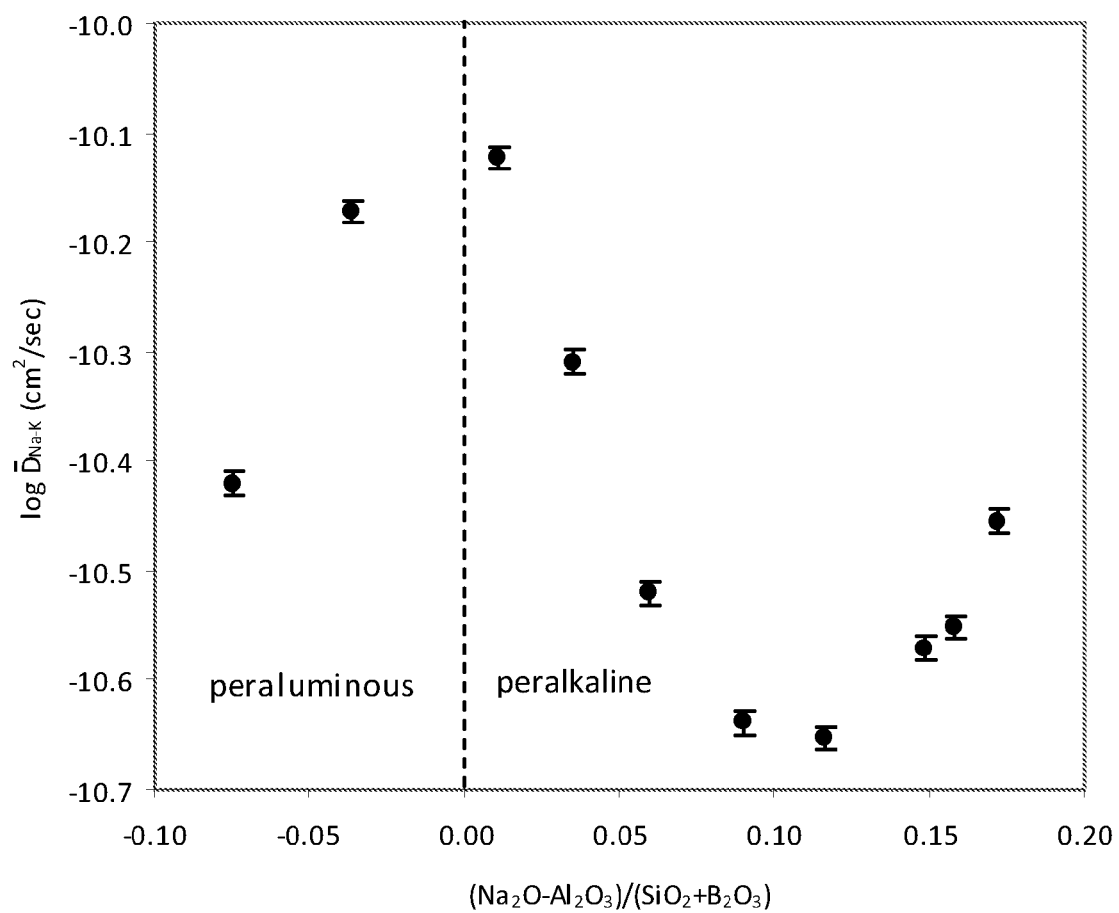
FIG. 12 is a plot showing the logarithm of the effective interdiffusion coefficient ($\overline{D}_{Na\text{-}K}$) as a function of composition for the borosilicate glasses (boroaluminosilicate glasses) of Table 2A. As the SiO$_2$/Al$_2$O$_3$ ratio changes the roles of sodium and boron are changing as well.

FIG. 12 shows the composition dependence of the logarithmic effective interdiffusion coefficient (log $\overline{D}_{Na-K}$) upon ion exchange at 410° C. in KNO$_3$ for 8 h. As shown in this figure, log $\overline{D}_{Na-K}$ attains its maximum value around the composition where [Na$_2$O]=[Al$_2$O$_3$]. However, the composition dependence of log $\overline{D}_{Na-K}$ is not a simple function of the [Al$_2$O$_3$]/[SiO$_2$] ratio, since the roles of the various species change simultaneously.

Figure 13:
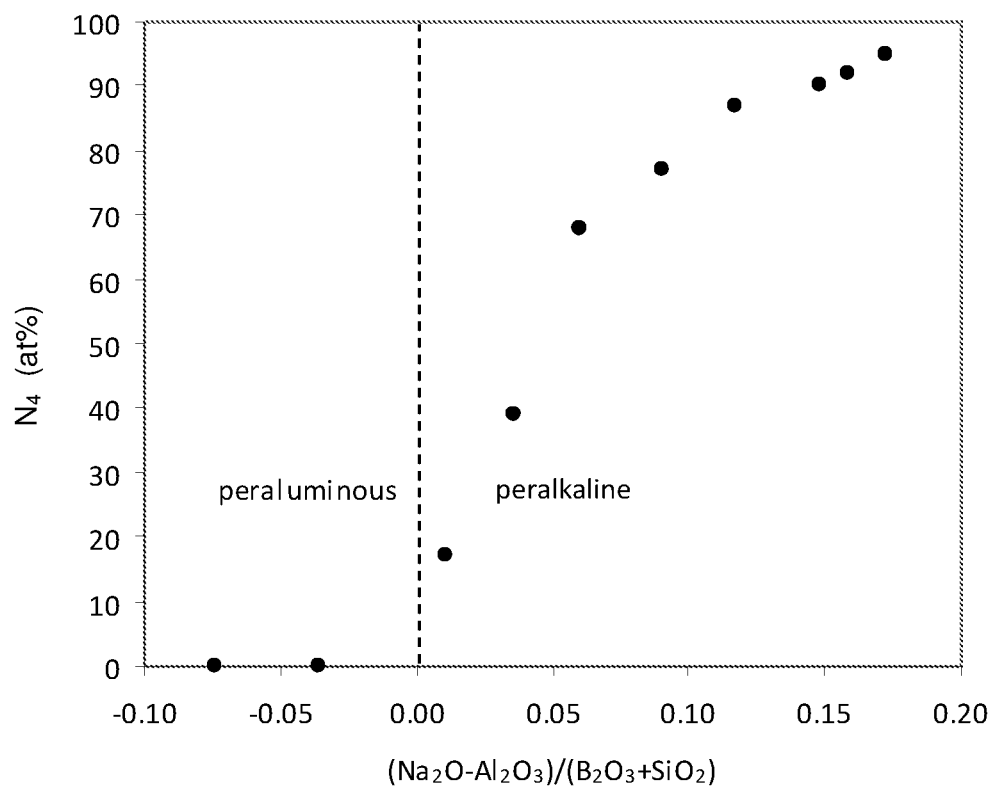
FIG. 13 is a plot showing the fraction of four-coordinated to total boron ($N_4$) as a function of composition for the borosilicate glasses (boroaluminosilicate glasses) of Table 2A.
Figure 14:
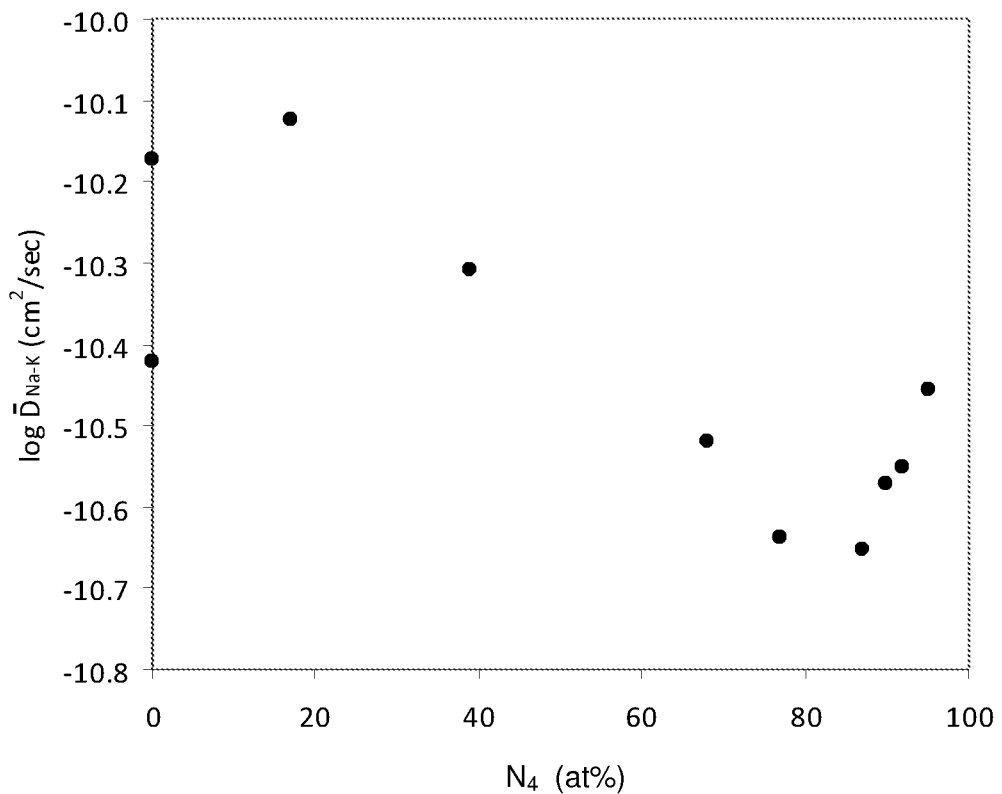
FIG. 14 is a plot showing the logarithm of the effective interdiffusion coefficient ($\overline{D}_{Na\text{-}K}$) as a function of the fraction of four-coordinated to total boron ($N_4$) for the borosilicate glasses (boroaluminosilicate glasses) of Table 2A.

FIG. 13 illustrates that the fraction of four-coordinated boron (N$_4$) increases with increasing [Na$_2$O]−[Al$_2$O$_3$] value. Hence, when sodium is not entirely used for charge-compensating AlO$_4$, the fraction of four-coordinated boron begins to increase. FIG. 14, which plots log $\overline{D}_{Na-K}$ as a function of N$_4$, further shows that log $\overline{D}_{Na-K}$ decreases with increasing concentration of four-coordinated boron groups, which is in agreement with the results reported above for the "model" borosilicate glasses. However, the correlation is not as strong as that above, since various factors are influencing simultaneously.

Figure 15:
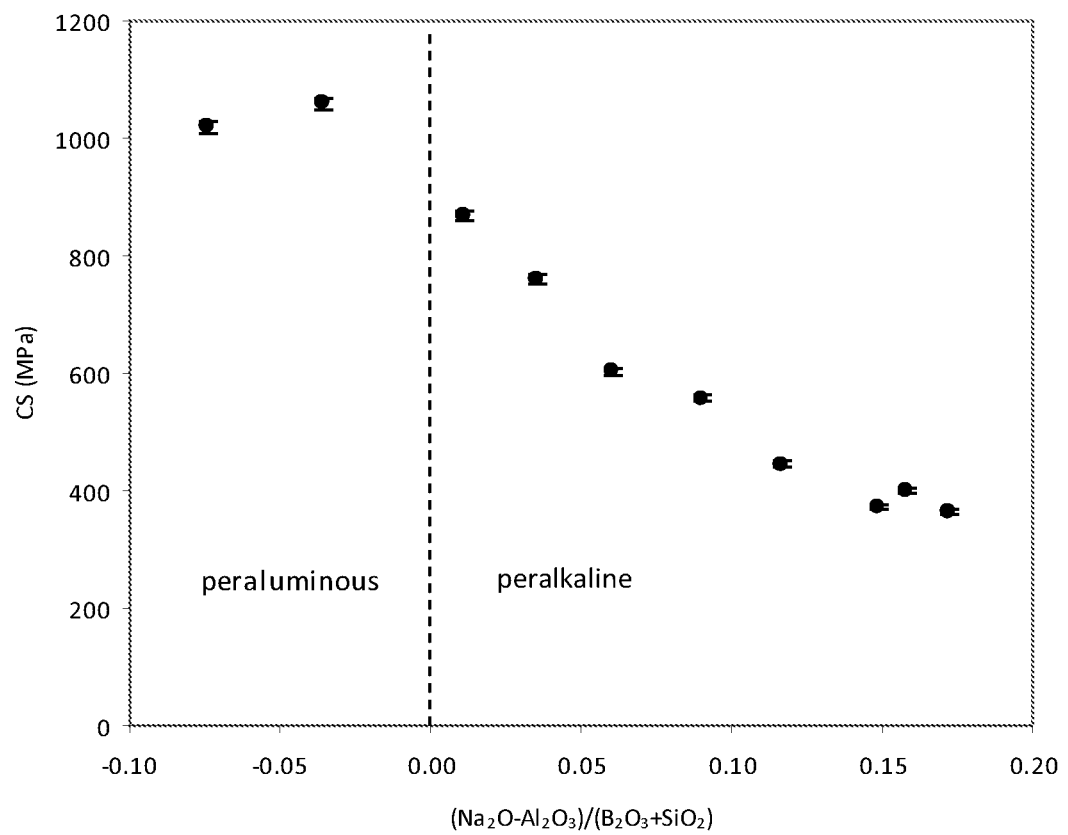
FIG. 15 is a plot showing compressive stress (CS) as a function of composition for the borosilicate glasses (boroaluminosilicate glasses) of Table 2A. CS was measured using a FSM-6000 instrument on samples which were chemically-strengthened in a KNO$_3$ salt bath at 410° C. for 8 hours.
Figure 16:
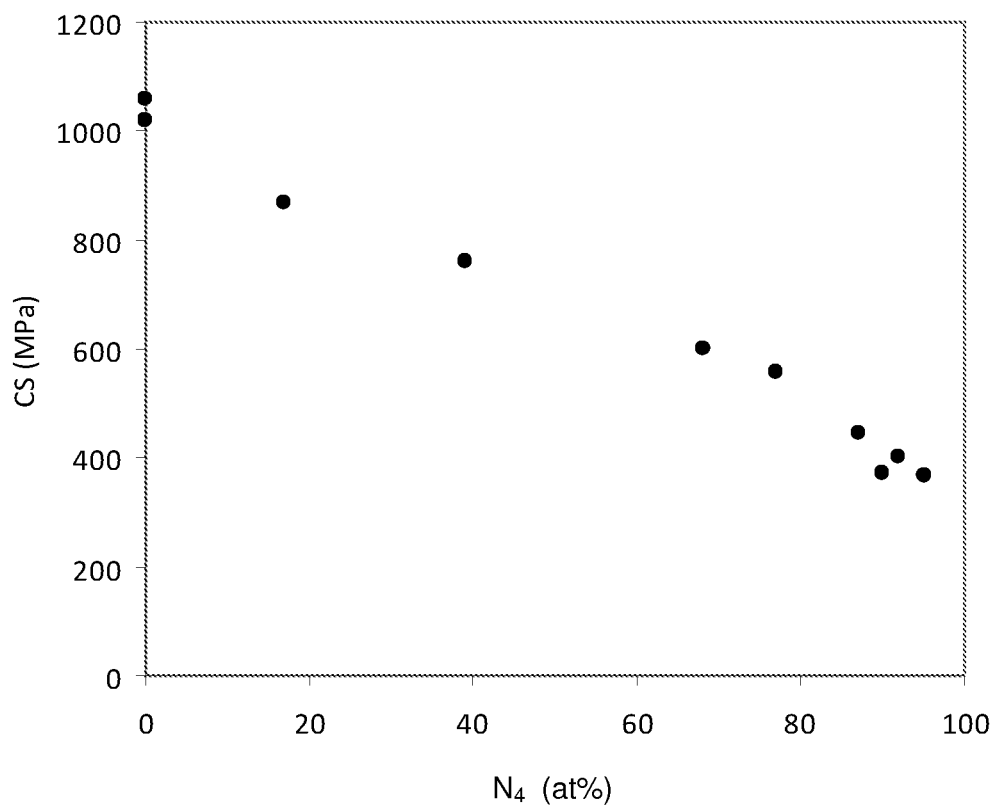
FIG. 16 is a plot showing compressive stress (CS) as a function of the fraction of four-coordinated to total boron ($N_4$) for the borosilicate glasses (boroaluminosilicate glasses) of Table 2A. CS was measured using a FSM-6000 instrument on the samples which were chemically-strengthened in a KNO$_3$ salt bath at 410° C. for 8 h.

In addition to the log $\overline{D}_{Na-K}$ studies, the maximum surface compressive stress (CS) developed in the glasses of Tables 2A and 2B upon ion exchange at 410° C. in KNO$_3$ for 8 hours was measured optically using the equipment referred to above. FIG. 15 shows that the compressive stress was highest in the peraluminous regime (i.e., for [Na$_2$O]<[Al$_2$O$_3$]) and then decreases with increasing [Na$_2$O]−[Al$_2$O$_3$] value. FIG. 16 further shows that the compressive stress decreases monotonically with increasing concentration of four-coordinated boron species. Hence, both diffusivity and compressive stress is favored by three-coordinated in comparison to four-coordinated boron species. The concentration of four-coordinated boron should thus be minimized in order to maximize the ion exchange performance.

In view of the above considerations, in an embodiment, the concentration of the components of the glass in mole percent on an oxide basis satisfy the relationship:

−0.025≤(Σ[R$_2$O]−[Al$_2$O$_3$])/([B$_2$O$_3$]+[SiO$_2$])≤+0.025, where Σ[R$_2$O] is the sum of concentrations of oxides of cations having a +1 charge.

III. Impact of Boron Speciation on Intrinsic Damage Resistance

Figure 17:
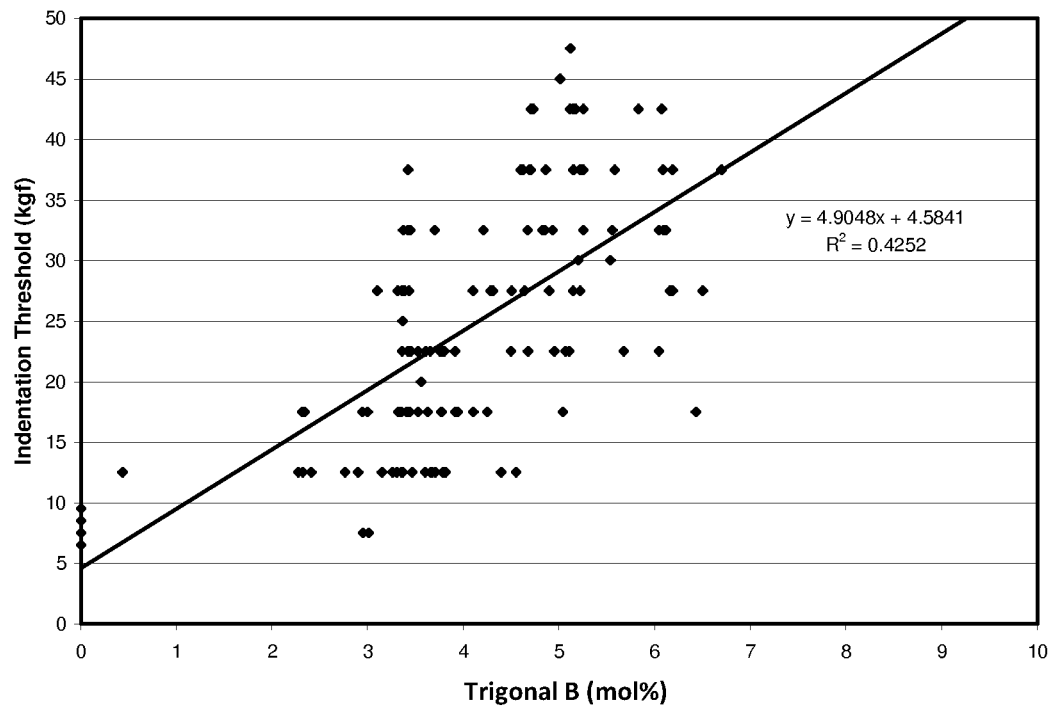
FIG. 17 is a plot showing measured indentation threshold for various borosilicate glasses having compositions in the ranges of Table 3. Of all the composition and property variables of Table 3, the indentation threshold displays the greatest correlation with the mol % of trigonal B$_2$O$_3$ in the glass. The glasses had been chemical strengthening in a KNO$_3$ salt bath at 410° C. for 8 h. The solid line represents a linear fit to the data.

As the demand for chemically-strengthened glass shifts to thinner products, the importance of intrinsic damage resistance becomes greatly enhanced. FIG. 17 plots measured indentation threshold values for various borosilicate glasses within the ranges set forth in Table 3. The indentation thresholds (also known as crack initiation thresholds) were measured by making multiple indentations (indents) in the glass using a Vickers diamond indenter loaded onto the surface. The load was increased until formation of median or radial cracks extending out from the corners of the indent impression was observed at the surface of the glass in greater than 50% of indents. As shown in Table 3, the range of measured indentation thresholds ("Ind Thrsh") was from 1.5 to 50 kgf, where the ion-exchange treatment was conducted at 390° C. for 8 hours using 100% KNO$_3$.

Because annealed glass made from a crucible melt has a fictive temperature approximately equal to the anneal temperature, it ion exchanges at a slower rate and exhibits a higher compressive stress and a lower indentation threshold than, for example, glass made by a fusion process. To simulate the fusion process, glasses subjected to an indentation threshold measurement were first subjected to a thermal treatment in which 1 mm thick glass samples were held at a temperature which gave the glass a viscosity of 10$^{11}$ poise for 4 minutes and then quenched by pulling the samples from the furnace and immediately cooling them by blowing ambient air on the samples using a fan. The temperature at which the samples were held is the "Fictivation Temp." of Table 3.

Returning to FIG. 17, this figure shows that the indentation threshold increases sharply as the content of trigonal B$_2$O$_3$ increases. Significantly, out of all the composition variables (e.g., total B$_2$O$_3$, etc.) and property values (e.g., shear modulus, etc.) the intrinsic damage resistance shows the greatest correlation with the concentration of three-coordinated boron in the glass.

Figure 18:
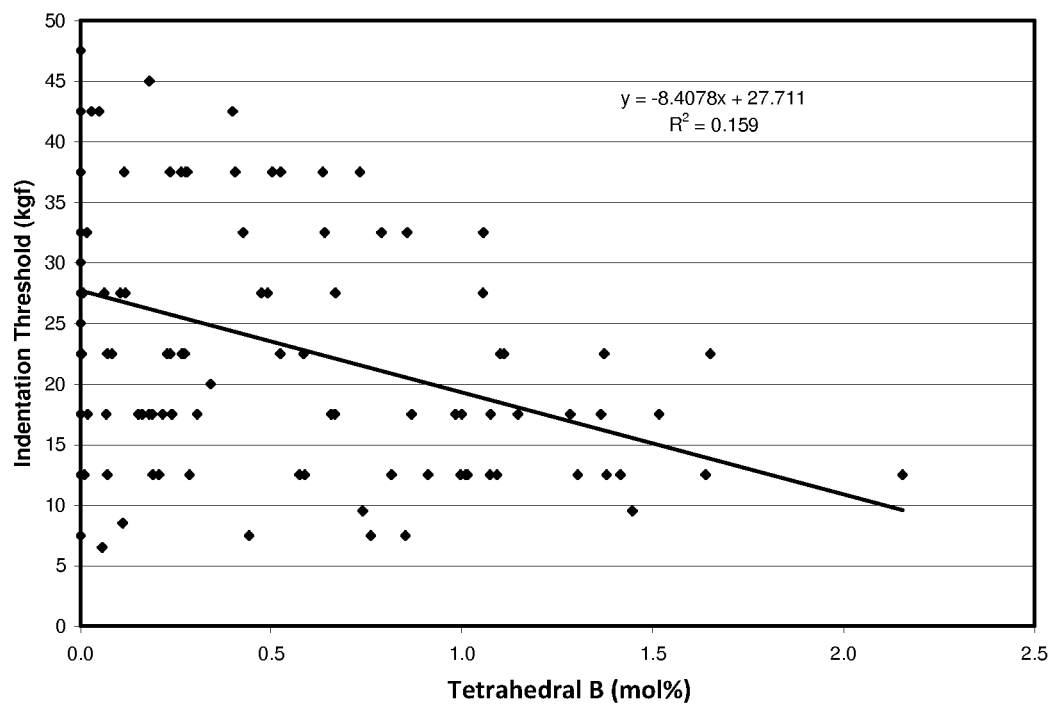
FIG. 18 is a plot showing that measured indentation threshold scales negatively with the concentration of tetrahedral boron for various borosilicate glasses having compositions in the ranges of Table 3. The highest indentation thresholds are obtained where the concentration of tetrahedral boron is minimized. The glasses had been chemical strengthening in a KNO$_3$ salt bath at 410° C. for 8 h. The solid line represents a linear fit to the data.

FIG. 18 plots the same indentation threshold data as in FIG. 17 versus the concentration of tetrahedrally coordinated boron for the same set of glass compositions. The figure clearly shows the negative impact of four-coordinated boron on indentation threshold. The glasses with the highest indentation threshold all occur when the concentration of tetrahedral boron is minimized.

Figure 19:
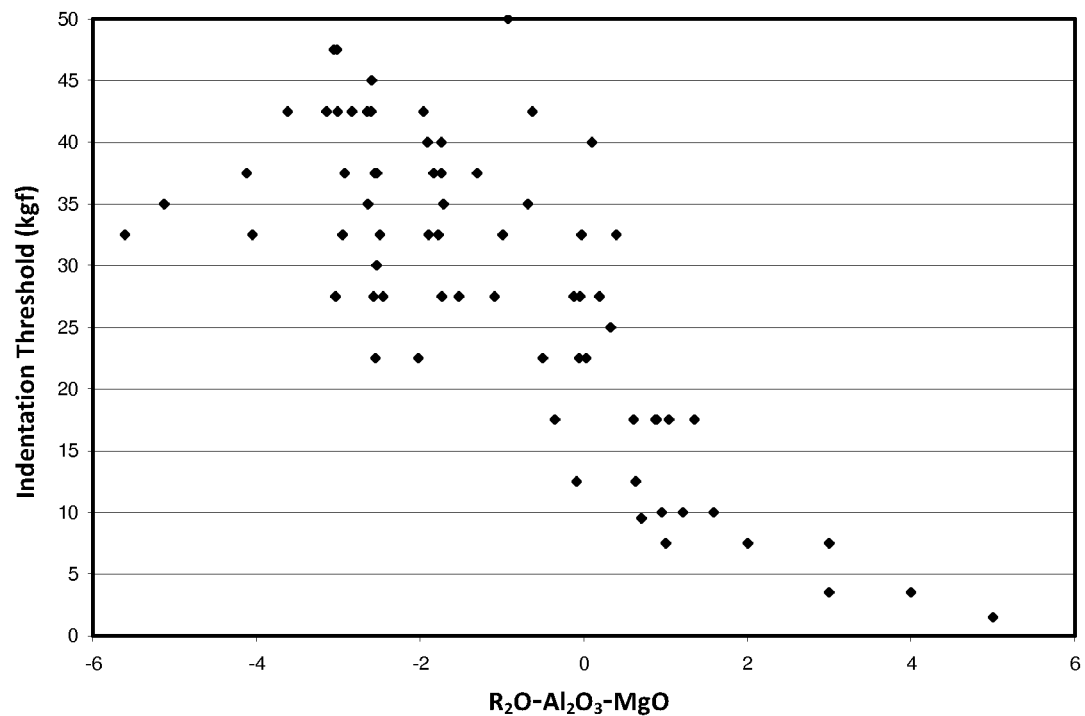
FIG. 19 is a plot showing measured indentation threshold for various borosilicate glasses having compositions in the ranges of Table 3 as a function of R$_2$O—Al$_2$O$_3$—MgO. The glasses had a boron content of 5.0±0.25 mol % and had undergone chemical strengthening in a KNO$_3$ salt bath at 410° C. for 8 h. As shown in this figure, to achieve an indentation threshold greater than 15 kgf after ion exchange, the glass needed to have less than 2 mol % excess modifier.
Figure 20:
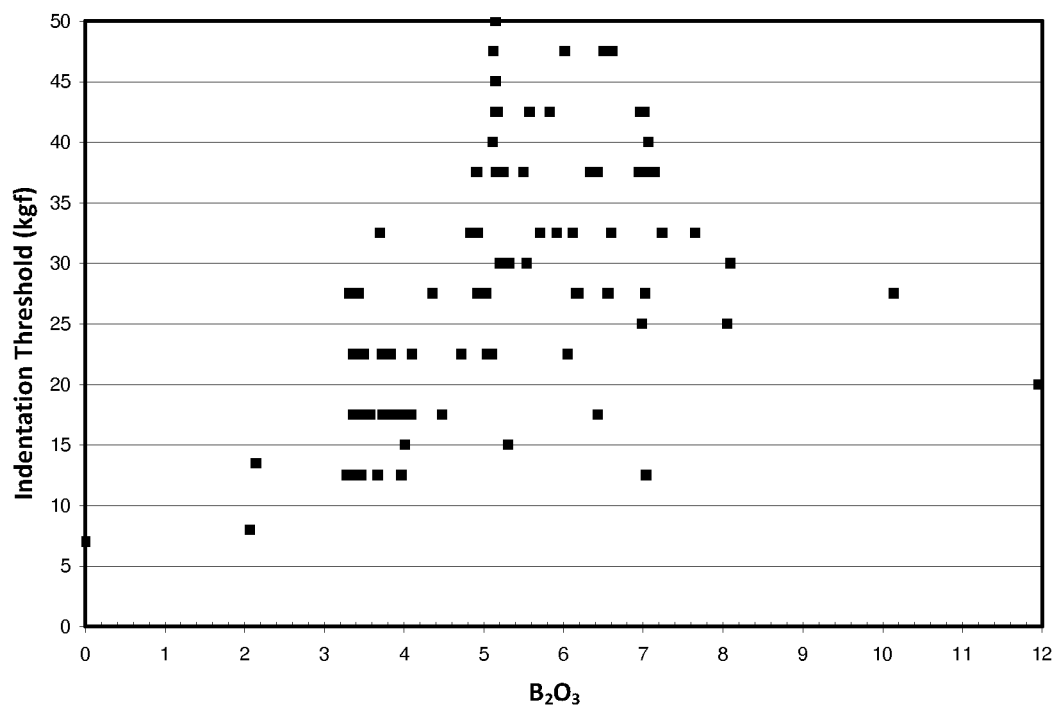
FIG. 20 is a plot showing measured indentation threshold for various borosilicate glasses having compositions in the ranges of Table 3 as a function of B$_2$O$_3$ content. The glasses had a R$_2$O—Al$_2$O$_3$ content of 0±0.25% and had undergone chemical strengthening in a KNO$_3$ salt bath at 410° C. for 8 h. To achieve an indentation threshold greater than 15 kgf after ion exchange, the glass must have at least 3 mol % B$_2$O$_3$.

The intrinsic damage resistance of a glass is typically assessed via its indentation threshold value. Three contributors to indentation threshold can be identified. First, the fictive temperature of the glass is preferably as high as possible to allow as much mechanical compression as possible. The higher the fictive temperature of the glass, the lower its density and the greater its ability to densify before cracking. Second, there preferably is less than 2 mol % of excess modifier to ensure that most of the B$_2$O$_3$ is in the trigonal configuration. This creates a more open glass structure that is then able to densify upon mechanical compression. FIG. 19 shows the indentation threshold after ion exchange for glasses with 5.0±0.25% B$_2$O$_3$ as a function of R$_2$O—Al$_2$O$_3$—MgO. As the excess modifier increases, more boron is converted to tetrahedral BO$_4$ species which creates a more rigid network that is less able to densify upon mechanical compression resulting in a lower indentation threshold. Finally, as shown in FIG. 20, the glass should contain at least 3 mole percent of B$_2$O$_3$.

Thus, in the design of glasses which are to be chemically-strengthened, it is important to maintain boron in the three-coordinated configuration. In this way, both ion exchange properties through increased diffusivity and intrinsic damage resistance (as quantified through the indentation threshold) can be improved.

In view of the above considerations, in an embodiment, the concentrations of the components of the glass in mole percent on an oxide basis satisfy the relationships:

−0.25≤Σ[R$_2$O]−[Al$_2$O$_3$]≤+0.25, and

[B$_2$O$_3$]≥3, where Σ[R$_2$O] is the sum of concentrations of oxides of cations having a +1 charge.

IV. Conclusion

As shown above in Section I, for a series of soda-lime-borosilicate glasses, 99% of the composition dependence of the logarithmic sodium-potassium interdiffusion coefficient (log $\overline{D}_{Na-K}$) can be ascribed to the change in concentration of tetrahedral boron groups. This indicates that the formation of $BO_{4/2}$ groups slows down diffusion processes of alkali ions. Further, as shown in Section II, this correlation between boron speciation and ion exchange properties also applies to more complicated boroaluminosilicate glasses. In addition, as shown in Section III, the resistance of glasses towards crack initiation (indentation threshold) is also favored by the trigonal boron species. Hence, glasses for ion exchange strengthening should be produced from batch materials selected to reduce the concentration of four-fold coordinated boron species.

The glasses which can benefit from boron speciation can have a wide variety of compositions and can be formed into desired articles, e.g., glass sheets, by a variety of forming techniques, now known or subsequently developed. Examples of the types of forming techniques that can be used include the float process and the overflow downdraw fusion process, both of which are currently in wide commercial use. The batch materials used to produce the glasses can be conventional materials currently in use or used in the past, or new batch materials that may come into use in the future.

The glasses to which boron speciation is applied need to include $SiO_2$ and $B_2O_3$, and will also generally include $Al_2O_3$ and at least one cation having a charge of +1. Additionally, they can include cations having a charge of +2, such as $Mg^{+2}$, $Ca^{+2}$, and/or $Zn^{+2}$. Other possible components include fining agents, such as, tin and/or antimony. In terms of concentrations, ranges for representative components are set forth in Table 3. Other examples of components and concentration ranges that can be used include:

(1) 60-72 mol % $SiO_2$; 6-14 mol % $Al_2O_3$; 0-15 mol % $B_2O_3$; 0-1 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol %≤$Li_2O+Na_2O+K_2O$≤20 mol % and 0 mol %≤MgO+CaO≤10 mol %;

(2) 61 mol %≤$SiO_2$≤75 mol %; 7 mol %≤$Al_2O_3$≤15 mol %; 0 mol %≤$B_2O_3$≤12 mol %; 9 mol %≤$Na_2O$≤21 mol %; 0 mol %≤$K_2O$≤4 mol %; 0 mol %≤MgO≤7 mol %; and 0 mol %≤CaO≤3 mol %;

(3) from about 7 mol % to about 26 mol % $Al_2O_3$; from 0 mol % to about 9 mol % $B_2O_3$; from about 11 mol % to about 25 mol % $Na_2O$; from 0 mol % to about 2.5 mol % $K_2O$; from 0 mol % to about 8.5 mol % MgO; and from 0 mol % to about 1.5 mol % CaO and wherein −340+27.1·$Al_2O_3$−28.7·$B_2O_3$+15.6·$Na_2O$−61.4·$K_2O$+8.1·(MgO+ZnO)≥0 mol %; and (4) 50-72 mol % $SiO_2$; 9-17 mol % $Al_2O_3$; 2-12 mol % $B_2O_3$; 8-16 mol % $Na_2O$; and 0-4 mol % $K_2O$, wherein 8≤$Na_2O+K_2O$≤18, where, in mole percent, the sum of $Al_2O_3$ plus $B_2O_3$ divided by the sum of the modifiers in the glass is greater than 1.

The foregoing components and ranges should, of course, not be considered as limiting since boron speciation can be practiced with any glass composition suitable for chemical-strengthening which includes $SiO_2$ and $B_2O_3$.

The components used in the glass and/or their concentrations can be based on boron speciation in a variety of ways. For example, the chemical-strengthening properties of a base glass, e.g., an existing commercial glass, can be changed based on measured and/or estimated (e.g., modeled) values for the boron speciation of the glass. Specifically, an altered composition can be designed based on boron speciation values and then produced. As another alternative, a library of glasses can be examined to determine the boron speciation of some or all of the members of the library. One or more members of the library can then be selected for production. Boron speciation can also be used as a guide when making the various compromises involved in selecting a glass composition for commercial production, e.g., compromises relating to manufacturability, customer preferences, cost, etc. These and other applications of boron speciation will be evident to persons skilled in the art from the present disclosure.

From the foregoing, it can be seen that methods have been provided for selecting the compositions of borosilicate glasses so as to improve their chemical-strengthening properties. Specifically, the compositions are selected to control boron speciation and, in particular, to promote trigonally-coordinated boron and suppress tetrahedrally-coordinated boron. By so doing, significant enhancement in both diffusivity (and hence depth of layer) and intrinsic damage resistance, as well as in maximum surface compressive stress, can be achieved.

A variety of modifications that do not depart from the scope and spirit of the invention will be evident to persons of ordinary skill in the art from the foregoing disclosure. The following claims are intended to cover the specific embodiments set forth herein as well as modifications, variations, and equivalents of those embodiments.

TABLE 1A

| Glass ID | Chemical Composition (mol %) | | | | $T_g$ (K) | $N_4$ (at %) |
| --- | --- | --- | --- | --- | --- | --- |
| | $SiO_2$ | $B_2O_3$ | $Na_2O$ | CaO | | |
| 75B | 0.0 | 74.1 | 15.4 | 10.5 | 775 | 39.9 |
| 63B-12Si | 12.7 | 62.0 | 14.9 | 10.4 | 790 | 45.3 |
| 51B-24Si | 24.9 | 49.3 | 15.0 | 10.8 | 803 | 48.9 |
| 37B-37Si | 36.9 | 38.4 | 14.1 | 10.6 | 813 | 53.5 |
| 24B-51Si | 51.6 | 21.9 | 15.5 | 11.0 | 833 | 65.5 |
| 12B-63Si | 63.8 | 10.8 | 14.8 | 10.6 | 842 | 75.8 |
| 6B-69Si | 69.3 | 4.9 | 16.1 | 9.8 | 837 | 80.8 |
| 75Si | 74.8 | 0.0 | 15.2 | 10.1 | 814 | n/a |

TABLE 1B

| Glass ID | Chemical composition (mol %) | | | | | ρ (g/cm³) | APF (−) | $T_g$ (K) | $[Fe^{3+}]/[Fe_{tot}]$ (at %) |
| --- | --- | --- | --- | --- | --- | --- | --- | --- | --- |
| | $SiO_2$ | $B_2O_3$ | $Na_2O$ | CaO | $Fe_2O_3$ | | | | |
| 74B | 0.0 | 73.1 | 15.2 | 10.7 | 1.0 | 2.344 | 0.569 | 771 | 93 |
| 62B-12Si | 12.5 | 61.3 | 14.9 | 10.2 | 1.1 | 2.417 | 0.571 | 780 | 92 |
| 50B-24Si | 23.1 | 51.5 | 14.2 | 10.2 | 1.0 | 2.490 | 0.575 | 792 | 91 |
| 37B-37Si | 37.9 | 36.0 | 15.3 | 9.9 | 0.9 | 2.539 | 0.562 | 812 | 87 |
| 24B-50Si | 52.1 | 22.1 | 14.0 | 10.8 | 1.0 | 2.581 | 0.547 | 826 | 87 |
| 12B-62Si | 63.4 | 10.8 | 14.3 | 10.5 | 1.0 | 2.587 | 0.529 | 831 | 82 |

TABLE 1B-continued

| | Chemical composition (mol %) | | | | | ρ | APF | $T_g$ | $[Fe^{3+}]/[Fe_{tot}]$ |
|---|---|---|---|---|---|---|---|---|---|
| Glass ID | $SiO_2$ | $B_2O_3$ | $Na_2O$ | CaO | $Fe_2O_3$ | (g/cm³) | (–) | (K) | (at %) |
| 6B-68Si | 69.1 | 5.2 | 14.8 | 9.9 | 1.0 | 2.570 | 0.516 | 829 | 78 |
| 74Si | 75.3 | 0.0 | 13.9 | 9.7 | 1.1 | 2.530 | 0.499 | 817 | 79 |

TABLE 2A

| Glass ID | Chemical composition (mol %) | | | | | CS (MPa) | $N_4$ (at %) | log Diffusivity (cm²/s) |
|---|---|---|---|---|---|---|---|---|
| | $SiO_2$ | $Al_2O_3$ | $Na_2O$ | $B_2O_3$ | $As_2O_3$ | | | |
| Al0 | 80.1 | 0.2 | 14.8 | 4.8 | | 364.8 | 95.0 | –10.46 |
| Al1 | 79.4 | 1.2 | 14.5 | 4.9 | 0.1 | 400.4 | 92.0 | –10.55 |
| Al2.5 | 78.8 | 2.0 | 14.4 | 4.7 | 0.1 | 370.6 | 90.0 | –10.57 |
| Al5 | 78.1 | 4.0 | 13.6 | 4.2 | 0.1 | 445.8 | 87.0 | –10.65 |
| Al7.5 | 76.9 | 5.7 | 13.0 | 4.3 | 0.1 | 557.0 | 77.0 | –10.64 |
| Al10 | 75.9 | 7.5 | 12.3 | 4.3 | 0.1 | 602.1 | 68.0 | –10.52 |
| Al12.5 | 72.0 | 10.4 | 13.1 | 4.4 | 0.1 | 760.5 | 39.0 | –10.31 |
| Al15 | 69.2 | 12.7 | 13.5 | 4.6 | 0.1 | 869.0 | 17.0 | –10.12 |
| Al17.5 | 63.0 | 17.2 | 14.7 | 5.0 | 0.1 | 1058.9 | 0.0 | –10.17 |
| Al20 | 60.5 | 19.6 | 14.7 | 5.0 | 0.1 | 1018.0 | 0.0 | –10.42 |

TABLE 2B

| Glass ID | Chemical composition (mol %) | | | | | CS (MPa) | log Diffusivity (cm²/s) |
|---|---|---|---|---|---|---|---|
| | $SiO_2$ | $Al_2O_3$ | $Na_2O$ | $B_2O_3$ | $Fe_2O_3$ | | |
| Al0/Fe1 | 79.4 | 0.3 | 14.6 | 4.9 | 0.9 | 390.0 | –10.63 |
| Al1/Fe1 | 78.9 | 0.7 | 14.5 | 4.9 | 0.9 | 421.7 | –10.67 |
| Al2.5/Fe1 | 77.4 | 2.2 | 14.6 | 4.9 | 0.9 | 451.0 | –10.74 |
| Al5/Fe1 | 74.7 | 4.7 | 14.6 | 5.0 | 1.0 | 558.6 | –10.72 |
| Al7.5/Fe1 | 71.8 | 7.6 | 14.7 | 4.9 | 1.0 | 688.3 | –10.59 |
| Al10/Fe1 | 68.9 | 10.3 | 14.8 | 5.0 | 1.0 | 789.0 | –10.46 |
| Al12.5/Fe1 | 67.1 | 12.6 | 14.3 | 5.0 | 1.0 | 906.8 | –10.26 |
| Al15/Fe1 | 64.1 | 15.6 | 14.3 | 5.0 | 1.0 | 995.0 | –10.16 |
| Al17.5/Fe1 | 62.3 | 17.9 | 13.7 | 5.1 | 0.9 | 1073.3 | –10.35 |
| Al20/Fe1 | 61.1 | 19.4 | 13.6 | 5.0 | 0.9 | 1041.4 | –10.54 |

TABLE 3

| | Min | Max |
|---|---|---|
| Composition (mol %) | | |
| $SiO_2$ | 50.50 | 70.65 |
| $Al_2O_3$ | 10.51 | 21.09 |
| $B_2O_3$ | 0.00 | 11.96 |
| $Na_2O$ | 11.72 | 20.12 |
| $K_2O$ | 0.00 | 2.01 |
| MgO | 0.00 | 5.22 |
| CaO | 0.01 | 1.00 |
| ZnO | 0.00 | 1.79 |
| $SnO_2$ | 0.06 | 0.12 |
| $R_2O—Al_2O_3$ | –2.37227 | 5 |
| Properties | | |
| Strain (° C.) | 519 | 741 |
| Anneal (° C.) | 565 | 800 |
| Softening (° C.) | 765 | 1016 |
| CTE ($10^{-7}$/° C.) | 66.7 | 100.9 |
| Density (g/cc) | 2.36 | 2.503 |
| Liquidus (° C.) | 825 | 1190 |
| Young's Mod (Mpsi) | 8.94 | 10.759 |
| Shear Mod (Mpsi) | 3.62 | 4.328 |
| Poisson's ratio | 0.199 | 0.243 |
| SOC | 29.65 | 35.77 |
| Index | 1.4956 | 1.502008 |
| Fictivation Temp (° C.) | 637 | 920 |
| Ind Thrsh (kgf) | 1.5 | 50 |

What is claimed is:

1. A method of making a glass article comprising:
   (I) melting batch materials to produce molten glass; and
   (II) forming a glass article from the molten glass;
   wherein:
   (A) the batch materials provide a plurality of components to the glass that affect at least one chemical-strengthening property of the glass;
   (B) said plurality of components comprises $SiO_2$ and $B_2O_3$; and
   (C) the method is characterized by selecting said plurality of components and/or their concentrations in the glass at least partially based on: (i) a measured and/or estimated value for the percentage of boron in the glass that is threefold coordinated; or (ii) a measured and/or estimated value for the percentage of boron in the glass that is fourfold coordinated; or (iii) measured and/or estimated values for the percentage of boron in the glass that is threefold coordinated and the percentage of boron in the glass that is fourfold coordinated.

2. The method of claim 1 wherein in said selecting:
   (a) said plurality of components comprises at least one cation that has a charge of +1;
   (b) said at least one chemical-strengthening property of the glass comprises the mutual diffusivity of said cation and a cation of a bath used in an ion-exchange process, the cation of the bath having a charge of +1; and
   (c) the measured and/or estimated value for the percentage of boron in the glass that is threefold coordinated is greater than the measured and/or estimated value for the percentage of boron in the glass that is fourfold coordinated.

3. The method of claim 2 wherein in said selecting said cation is $Na^{+1}$ and the cation of the bath is $K^{+1}$.

4. The method of claim 2 wherein in said selecting said cation is $Li^{+1}$ and the cation of the bath is $K^{+1}$.

5. The method of claim 2 wherein in said selecting said cation is $Li^{+1}$ and the cation of the bath is $Na^{+1}$.

6. The method of claim 2 wherein in said selecting:
   (a) said plurality of components comprises $Al_2O_3$; and
   (b) the concentrations of the components in mole percent on an oxide basis satisfy the relationship:

$$-0.025 \leq (\Sigma[R_2O]-[Al_2O_3])/([B_2O_3]+[SiO_2]) \leq +0.025,$$

where $\Sigma[R_2O]$ is the sum of concentrations of oxides of cations having a +1 charge.

7. The method of claim 6 where in said selecting:

$$\Sigma[R_2O]=[Na_2O], \text{ or}$$

$$\Sigma[R_2O]=[Na_2O]+[K_2O].$$

8. The method of claim 1 wherein in said selecting:
(a) said at least one chemical-strengthening property of the glass comprises the maximum surface compressive stress produced in the glass by an ion-exchange process; and
(b) the measured and/or estimated value for the percentage of boron in the glass that is threefold coordinated is greater than the measured and/or estimated value for the percentage of boron in the glass that is fourfold coordinated.

9. The method of claim 8 wherein in said selecting:
(a) said plurality of components comprises $Al_2O_3$ and at least one cation that has a charge of +1; and
(b) the concentrations of the components in mole percent on an oxide basis satisfy the relationship:

$$\Sigma[R_2O] < [Al_2O_3],$$

where $\Sigma[R_2O]$ is the sum of concentrations of oxides of cations having a +1 charge.

10. The method of claim 1 wherein in said selecting:
(a) said at least one chemical-strengthening property of the glass comprises the glass's indentation threshold after an ion-exchange process; and
(b) the measured and/or estimated value for the percentage of boron in the glass that is threefold coordinated is greater than the measured and/or estimated value for the percentage of boron in the glass that is fourfold coordinated.

11. The method of claim 10 wherein in said selecting:
(a) said plurality of components comprises $Al_2O_3$ and at least one cation that has a charge of +1; and
(b) the concentrations of the components in mole percent on an oxide basis satisfy the relationships:

$$-0.25 \leq \Sigma[R_2O] - [Al_2O_3] \leq +0.25, \text{ and}$$

$$[B_2O_3] \geq 3,$$

where $\Sigma[R_2O]$ is the sum of concentrations of oxides of cations having a +1 charge.

12. The method of claim 10 wherein in said selecting:
(a) said plurality of components comprises $Al_2O_3$, at least one cation that has a charge of +1, and at least one cation that has a charge of +2; and
(b) the concentrations of the components in mole percent on an oxide basis satisfy the relationships:

$$\Sigma[R_2O] - [Al_2O_3] - \Sigma[R'O] \leq +2,$$

where $\Sigma[R_2O]$ is the sum of concentrations of oxides of cations having a +1 charge and $\Sigma[R'O]$ is the sum of concentrations of oxides of cations having a +2 charge.

13. The method of claim 1 further comprising subjecting the glass article to an ion-exchange process.

14. The method of claim 13 wherein the glass article is a glass sheet.

* * * * *